United States Patent
Wu et al.

(10) Patent No.: US 11,354,287 B2
(45) Date of Patent: Jun. 7, 2022

(54) LOCAL ORTHOGONAL DECOMPOSITION FOR MAXIMUM INNER PRODUCT SEARCH

(71) Applicant: GOOGLE LLC, Mountain View, CA (US)

(72) Inventors: Xiang Wu, Piscataway, NJ (US); David Morris Simcha, Jersey City, NJ (US); Sanjiv Kumar, Jericho, NY (US); Ruiqi Guo, Elmhurst, NJ (US)

(73) Assignee: Google LLC, Mountain View, CA (US)

( * ) Notice: Subject to any disclaimer, the term of this patent is extended or adjusted under 35 U.S.C. 154(b) by 177 days.

(21) Appl. No.: 16/715,620

(22) Filed: Dec. 16, 2019

(65) Prior Publication Data
US 2020/0257668 A1 Aug. 13, 2020

Related U.S. Application Data

(60) Provisional application No. 62/802,370, filed on Feb. 7, 2019.

(51) Int. Cl.
*G06F 16/20* (2019.01)
*G06F 16/22* (2019.01)
(Continued)

(52) U.S. Cl.
CPC ........ *G06F 16/2237* (2019.01); *G06F 16/248* (2019.01); *G06F 16/2458* (2019.01);
(Continued)

(58) Field of Classification Search
CPC ............. G06F 16/2237; G06F 16/2458; G06F 16/285; G06F 16/278; G06F 16/248
See application file for complete search history.

(56) References Cited

U.S. PATENT DOCUMENTS

| | | | | |
|---|---|---|---|---|
| 5,966,471 A | * | 10/1999 | Fisher | ..................... G06T 9/008 382/253 |
| 10,194,175 B2 | * | 1/2019 | Monro | ................... H04N 19/61 |

(Continued)

OTHER PUBLICATIONS

"Quantization based Fast Inner Product search" dated Sep. 4, 2015 (hereinafter NPL_DOC) (Year: 2015).*
(Continued)

*Primary Examiner* — Tarek Chbouki
(74) *Attorney, Agent, or Firm* — Brake Hughes Bellermann LLP

(57) ABSTRACT

Techniques of indexing a database and processing a query involve decomposing the residual term according to a projection matrix that is based on a given direction v. For example, for each database element of a partition, the residual for that database element is split into a component parallel to a given direction and a component perpendicular to that direction. The parallel component lies in a one-dimensional subspace spanned by the direction and may be efficiently quantized with a scalar quantization. The perpendicular component is quantized using multiscale quantization techniques. The quantized residual components and the center elements of each partition define the indexed database. Upon receipt of a query from a user, the inner products of q with the residual may be computed efficiently using the quantized residual components. From these inner products, the database elements that are most similar to the query are selected and returned to the user.

20 Claims, 11 Drawing Sheets

(51) Int. Cl.
| | |
|---|---|
| *G06F 16/27* | (2019.01) |
| *G06F 16/248* | (2019.01) |
| *G06F 16/28* | (2019.01) |
| *G06F 17/16* | (2006.01) |
| *G06F 16/2458* | (2019.01) |

(52) U.S. Cl.
CPC .......... *G06F 16/278* (2019.01); *G06F 16/285* (2019.01); *G06F 17/16* (2013.01)

(56) References Cited

U.S. PATENT DOCUMENTS

| | | | | |
|---|---|---|---|---|
| 2005/0105828 | A1* | 5/2005 | Oosawa ................... | G06T 19/00 382/294 |
| 2005/0166054 | A1* | 7/2005 | Fujimoto ............... | H04N 19/51 713/176 |
| 2016/0379083 | A1* | 12/2016 | Sala .......................... | G06T 7/75 345/633 |
| 2018/0101570 | A1* | 4/2018 | Kumar ............... | G06F 16/24537 |
| 2018/0204111 | A1* | 7/2018 | Zadeh .................. | G06K 9/3233 |
| 2018/0341805 | A1* | 11/2018 | Jain ......................... | G06F 17/00 |

OTHER PUBLICATIONS

Andre et al., "Cache Locality is not Enough: High-Performance Nearest Neighbor Search with Product Quantization Fast Scan", Proceedings of the VLDB Endowment, vol. 9, No. 4, 2015, pp. 288-299.

Auvolat et al., "Clustering is Efficient for Approximate Maximum Inner Product Search", arXiv preprint arXiv:1507 05910, Nov. 30, 2015, pp. 1-10.

Babenko et al., "Additive Quantization for Extreme Vector Compression", In Computer Vision and Pattern Recognition (CVPR), IEEE Conference, 2014, pp. 1-18.

Babenko et al., "Efficient Indexing of Billion-Scale Datasets of Deep Descriptors", IEEE Conference on Computer Vision and Pattern Recognition (CVPR), Jun. 2016, pp. 2055-2063.

Babenko et al., "Tree Quantization for Large-Scale Similarity Search and Classification", In Proceedings of the IEEE Conference on Computer Vision and Pattern Recognition, 2015, pp. 4240-4248.

Bachrach et al., "Speeding Up the Xbox Recommender System using a Euclidean Transformation for Innerproduct Spaces", In Proceedings of the 8th ACM Conference on Recommender Systems, 2014, pp. 257-264.

Bennett et al., "The Netflix Prize", In KDD Cup and Workshop in Conjunction with KDD, Aug. 12, 2007, 4 pages.

Blalock et al., "Bolt: Accelerated Data Mining with Fast Vector Compression", Proceedings of the 23rd ACM SIGKDD International Conference on Knowledge Discovery and Data Mining, Aug. 13-17, 2017, pp. 1-9.

Dean et al., "Fast, Accurate Detection of 100,000 Object Classes on a Single Machine", Proceedings of IEEE Conference on Computer Vision and Pattern Recognition, 2013, 8 pages.

Ge et al., "Optimized Product Quantization", IEEE Transactions on Pattern Analysis and Machine Intelligence vol. 36, No. 4, Apr. 2014, pp. 1-14.

Jegou et al., "Product Quantization for Nearest Neighbor Search", IEEE Transactions on Pattern Analysis and Machine Intelligence, vol. 33, Issue 1, 2011, pp. 117-128.

Johnson et al., "Billion-Scale Similarity Search with GPUs", arXiv preprint arXiv:1702.08734, 2017, pp. 1-12.

Kalantidis et al., "Locally Optimized Product Quantization for Approximate Nearest Neighbor Search", Computer Vision and Pattern Recognition (CVPR), 2014 IEEE Conference, Jun. 2014, pp. 1-8.

Martinez et al., "Revisiting Additive Quantization", European Conference on Computer Vision, 2016, pp. 137-153.

Martinez et al., "Stacked Quantizers for Compositional Vector Compression", CoRR abs/1411.2173, Nov. 8, 2014, pp. 1-8.

Mussmann et al., "Learning and Inference via Maximum Inner Product Search", Proceedings of the 33rd International Conference on Machine Learning, vol. 48, 2016, pp. 1-13.

Norouzi et al., "Cartesian k-means", Computer Vision and Pattern Recognition (CVPR), 2013 IEEE Conference on, 2013, pp. 1-8.

Pennington et al., "GloVe: Global Vectors for Word Representation", In Proceedings of the 2014 Conference on Empirical Methods in Natural Language Processing (EMNLP), Oct. 25-29, 2014, pp. 1532-1543.

Pritzel et al., "Neural Episodic Control", Proceedings of the 34th International Conference on Machine Learning, vol. 70, Mar. 6, 2017, pp. 1-12.

Shrivastava et al., "Asymmetric LSH (ALSH) for Sublinear Time Maximum Inner Product Search (MIPS)", In Advances in Neural Information Processing Systems, 2014, pp. 1-9.

Wu et al., "Multiscale Quantization for Fast Similarity Search", Advances in Neural Information Processing Systems, vol. 30, 2017, pp. 5745-5755.

Yen et al., "Loss Decomposition for Fast Learning in Large Output Spaces", Proceedings of the 35th International Conference on Machine Learning, vol. 80, 2018, pp. 5640-5649.

Yu et al., "A Greedy Approach for Budgeted Maximum Inner Product Search", 31st Conference on Neural Information Processing Systems (NIPS), vol. 80, 2017, pp. 1-10.

Zhang et al., "Composite Quantization for Approximate Nearest Neighbor Search", Proceedings of the 31st International Conference on Machine Learning, 2014, pp. 1-10.

Zhang et al., "Learning Spread-Out Local Feature Descriptors", IEEE International Conference on Computer Vision ICCV, Venice, Italy, Oct. 22-29, 2017, pp. 1-9.

Zhang et al., "Sparse Composite Quantization", Proceedings of the IEEE Conference on Computer Vision and Pattern Recognition, 2015, pp. 4548-4556.

\* cited by examiner

LOCAL ORTHOGONAL DECOMPOSITION FOR MAXIMUM INNER PRODUCT SEARCH

CROSS REFERENCE TO RELATED APPLICATION

This application claims the benefit of U.S. Provisional Application No. 62/802,370, filed Feb. 7, 2019, the disclosure of which is incorporated by reference herein in its entirety.

TECHNICAL FIELD

This description relates to large-scale classification and retrieval tasks.

BACKGROUND

In some large-scale classification and retrieval operations, items such as user queries, images, and documents are embedded in respective vector spaces of the same dimensionality d. Maximum Inner Product Search (MIPS) is a commonly used process for determining the classification of an item based on the vector. Formally, MIPS addresses the following problem: given a database of vectors $X=\{x_i\}_{[N]}$ where N is the number of database elements in the database X, and a query vector q such that $x_i$ and $q \in \mathbb{R}^d$, find $x_q^* \in X$ such that $$x_q^* = \operatorname*{argmax}_{x \in X} q \cdot x.$$

In other words, MIPS finds the database element in the database that maximizes the inner product with the query. The inner product provides a measure of similarity, with a larger inner product indicating increasing similarity. Accordingly, MIPS finds the database element that is most similar to the query by finding the largest inner product between the database element and the query.

The generation of full inner products for vectors of large dimensionality, such as those representing database elements in a database and queries, is computationally expensive. In large-scale classification and retrieval operations that rely on computations of full inner products, certain quantization techniques may be employed to reduce the space of possible best matches to a query and hence the cost of performing the full inner products. Example of such quantization techniques include the following:

Scalar Quantization (SQ): the quantization a continuous range of scalar values includes determining a number $n_{SQ}$ of codewords in a codebook. The codewords are found by, for example, minimizing the maximum distance between the scalar values and the $n_{SQ}$ unknown codewords. Mathematically, this is expressed as, for a codebook $B_{SQ}=\{y_i\}_{[n_{SQ}]}$ having $n_{SQ}$ scalar codewords, a scalar quantized value of a scalar z is $$\phi_{SQ} = \operatorname*{argmin}_{y \in B_{SQ}} |z - y|.$$

The bitrate per input is $l_{SQ} = \lfloor \log_2 n_{SQ} \rfloor$.

Uniform Quantization (UQ): UQ is a special case of SQ in which the codebook is parameterized with only two scalars: $B_{UQ}=\{ai+b\}_{[n_{UQ}]}$.

Vector Quantization (VQ): VQ is a generalization of SQ to vector spaces. Given a codebook $C=\{c_i\}_{[m]}$ with m codewords, an input vector x is quantized into $\phi_{VQ}(x) =$ $$\operatorname*{argmin}_{c \in C} \|x - c\|_2.$$

The code stored for vector x is the index of the closest codeword in the VQ codebook: index ($\phi_{VQ}(x)$).

Product Quantization (PQ): To apply PQ, divide a vector x into $n_B$ subspaces, i.e., subsets of the vector space to which x belongs: $x = x^{(1)} \oplus x^{(2)} \oplus \ldots \oplus x^{(n_B)} = \oplus_{i \in [n_B]} x^{(i)}$. Within each subspace, a VQ with is applied to $n_W$ codewords: $\phi_{PQ}(x) = \oplus_{i \in [n_B]} \phi_{VQ}^{(i)}$. The bitrate per input for PQ is $l_{PQ} = n_B \lfloor \log_2 n_W \rfloor$.

SUMMARY

A technique of indexing a database and processing a query includes performing a local orthogonal decomposition of a residual corresponding to a database element of a partitioned database. For each partition of the database, a respective direction is established. The residual term is then decomposed into a component parallel to the direction and a component perpendicular to the direction. The parallel and perpendicular components are then quantized separately and using different quantization techniques. For example, the parallel component may be quantized using a scalar quantization scheme, while the perpendicular component is quantized using a multiscale quantization technique. A database indexed using such a decomposition of the residuals showed improved recall with respect to databases indexed according to other techniques.

In one general aspect, a method can include receiving, by processing circuitry configured to perform indexing and search operations in a database, a plurality of database elements and direction data indicating a direction. The method can also include generating, by the processing circuitry, a plurality of partitions based on the plurality of database elements, each of the plurality of partitions corresponding to a respective subset of the plurality of database elements and including a respective center element. The method can further include determining, for each database element of the plurality of database elements, a residual term, the residual term being a difference between the database element and the center element for the subset of the plurality of database elements to which the database element corresponds. The method can further include performing, by the processing circuitry, a first projection operation on the residual term using a first projection operator to produce a first component of the residual term and a second projection operation on the residual term using a second projection operator to produce a second component of the residual term, the first projection operator and the second projection operator being based on the direction, the first component being parallel to the direction, the second component being perpendicular to the direction. The method can further include performing, by the processing circuitry, a first quantization operation on the first component to produce a first quantized component. The method can further include performing, by the processing circuitry, a second quantization operation on the second component to produce a second quantized component, the second quantization operation being different from the first quantization operation. The method can further include storing, by the processing circuitry, the first quantized component, the second quantized component, and the codeword term in respective locations in a memory, the first quantized component, the second quantized component, and the center element providing an indexing of the database.

In another general aspect, a computer program product includes a nontransitory storage medium, the computer program product including code that, when executed by processing circuitry configured to process a query in a database, causes the processing circuitry to perform a method. The method can include receiving query data representing a query. The method can also include, for each of a first plurality of partitions of a database having database elements, generating a center inner product of the query and a respective center point of that partition to produce a plurality of center inner products. The method can further include selecting a first number of the first plurality of partitions to produce a second plurality of partitions, the selecting being based on the plurality of center inner products. The method can further include, for each of the second plurality of partitions and for each database element in the partition, generating a parallel inner product, the parallel inner product being an inner product between the first quantized component for the query data and a first quantized component of the database element; generating a perpendicular inner product, the parallel inner product being an inner product between the second quantized component for the query data and a second quantized component for the database element; and generating a sum of the parallel inner product, the perpendicular inner product, and the center inner product of the plurality of center inner products for that partition to produce a net inner product, the net inner product indicating a degree of similarity between the query and the database element. The method can further include selecting a specified number of database elements based on the plurality of net inner products. The method can further include returning the selected database elements.

In another general aspect, an electronic apparatus configured to perform indexing and search operations in a database. The electronic apparatus includes memory and controlling circuitry coupled to the memory. The controlling circuitry can be configured to receive a plurality of database elements and direction data indicating a direction; generate a plurality of partitions based on the plurality of database elements, each of the plurality of partitions corresponding to a respective subset of the plurality of database elements and including a respective center element; determine, for each database element of the plurality of database elements, a residual term, the residual term being a difference between the database element and the center element for the subset of the plurality of database elements to which the database element corresponds; perform a first projection operation on the residual term using a first projection operator to produce a first component of the residual term and a second projection operation on the residual term using a second projection operator to produce a second component of the residual term, the first projection operator and the second projection operator being based on the direction, the first component being parallel to the direction, the second component being perpendicular to the direction; perform a first quantization operation on the first component to produce a first quantized component; perform a second quantization operation on the second component to produce a second quantized component, the second quantization operation being different from the first quantization operation; and store the first quantized component and the second quantized component in respective locations in a memory, the first quantized component, the second quantized component, and the center element providing an indexing of the database.

The details of one or more implementations are set forth in the accompanying drawings and the description below. Other features will be apparent from the description and drawings, and from the claims.

DETAILED DESCRIPTION

Figure 1:
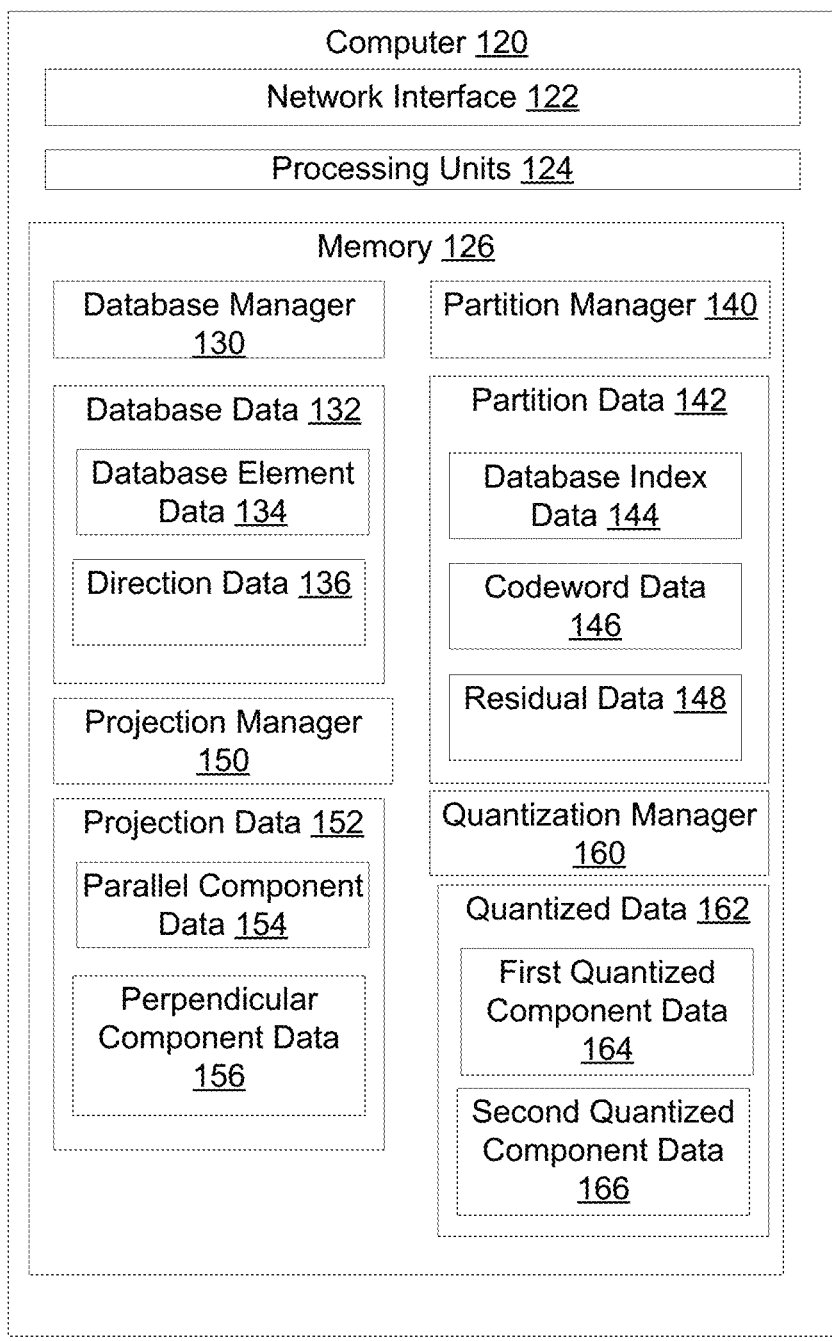
FIG. 1 is a diagram that illustrates a first example electronic environment for implementing improved techniques described herein.

A conventional approach to processing a query q involves using an inverted file, asymmetric distance computation (IVFADC) framework. This is an approximation of the actual inner product between a query item q and a database item x using quantization. In the IVFADC framework, a database X is vector quantized to produce a set of partitions $P_i$ each having a respective center $c_i$. That is, each partition $P_i$ includes those database elements x that are closer to its center $c_i$ than to the center of any other partition. The center $c_i$ of partition $P_i$ is taken to be a codeword of a codebook C used in the vector quantization of the database X. The codebook C may then be expressed as $C=\{c_i\}_{[m]}$, where m is the number of codewords in the codebook.

An inner product between the query q and a database item x may be expressed as $q \cdot x = q \cdot c_i + q \cdot (x - c_i)$. The code word of $c_i$ is selected because it is the most similar codeword in the codebook to database item x. The first term $q \cdot c_i$ may be referred to as a codeword term and the second term $q \cdot (x - c_i)$ may be referred to as a residual term. Different quantization schemes may be applied to each of the codeword and residual inner product terms. The IVFADC framework uses a vector quantization (VQ) for coarse partitioning and a product quantization (PQ) for residual quantization.

An inverted file (IVF) is generated using the VQ partitioning. Each VQ partition $P_i$ includes all database vectors x assigned to VQ center $c_i$, because $c_i$ is more similar to the database vector than any other codeword, i.e., $$P_i = \left\{ x \in X \mid c_i = \underset{c \in C}{\operatorname{argmin}} \|x - c\|_2 \right\}.$$

The IVFADC framework uses the IVF to determine the partitions most similar to a query. The top partitions may be denoted as $m_{ADC}$ partitions. These partitions are selected according to respective codeword terms, i.e., the inner product result between the codeword for the partition and the query $(q \cdot c_i)$, i.e. a center inner product. Within each partition $P_i$, residual vectors $\{r_x = x - c_i\}_{x \in P_i}$ are determined and then quantized using a product quantization (PQ). The quantized approximation of the residual $r_x$ is denoted as $\phi_{PQ}(r_x)$.

Asymmetric distance computation (ADC) is an efficient lookup algorithm that produces an approximate inner product. If $$\phi_{VQ}(x) = \underset{c \in C}{\operatorname{argmin}} \|x - c\|_2$$

represents the VQ approximation of x, then ADC (q, $\phi_{VQ}$(x))=lookup ($\{q \cdot c\}_{c \in C}$, index ($\phi_{VQ}(x)$)). That is, performing an ADC involves performing a lookup of center inner products by the index of the closest codeword in the VQ codebook. For the top $m_{ADC}$ partitions, this formulation of the ADC is applied to residuals in those partitions. Accordingly, the residual term may be expressed as $q \cdot r_x \approx q \cdot \phi_{PQ}(r_x)$ =ADC (q, $\phi_{PQ}(r_x)$)=$\Sigma_{i \in [n_B]}$ADC$^i$($q^i$, $\phi_{VQ}^i(r_x^i)$), where $n_B$ is the number of subspaces of the PQ.

A technical problem involved in the above-described conventional approach to processing a query q is that the quality of the inner product approximations described above depends on a joint distribution of query q that has maximum inner product with VQ center $c_i$ and residual $r_x = x - c_i$, where $c_i$ is the center of the partition to which x is assigned. The above-described conventional approach to processing a query q assumes that the residuals are uniformly distributed over a direction v, which is a unit vector in the same vector space in which the database elements and query are defined. It has been found, however, that this is not the case: an analysis of the variance of a projected inner product over direction v is highly elongated in one direction with respect to another. Such a skewed variance affects the quality of the inner product approximation and, accordingly, the recall of the classification and retrieval operations.

A technical solution to the above-described technical problem involves decomposing the residual term according to a projection matrix that is based on a given direction v. For example, for each database element of a partition, the residual for that database element, after applying vector quantization, is split into a component parallel to a given direction and a component perpendicular to that direction. The parallel component lies in a one-dimensional subspace spanned by the direction v and may be efficiently quantized with a first quantization technique, e.g., a scalar quantization. The perpendicular component, in contrast, is quantized using a second quantization technique, e.g., multiscale quantization techniques. The quantized residual components and the center elements of each partition define the indexed database. Upon receipt of a query q from a user, the inner products of the query q with the residual may be computed efficiently using the quantized residual components. From these inner products, the database elements that are most similar to the query are selected and returned to the user.

A technical advantage of the above-described technical solution is that the decomposition provides an improvement of recall of the classification and retrieval operations over the above-described conventional approaches to processing a query. Recall is defined as correctly identifying similar items. Better recall indicates that the approximation has fewer errors and provides a result more similar to a result obtained by performing MIPS without approximation. In addition, the combination of the local orthogonal decomposition and multiscale quantization described above has better recall than either alone.

FIG. 1 is a diagram that illustrates an example electronic environment 100 in which the above-described improved techniques may be implemented. As shown, in FIG. 1, the example electronic environment 100 includes a computer 120.

The computer 120 is configured to perform an indexing of a database. The computer 120 includes a network interface 122, one or more processing units 124, and memory 126. The network interface 122 includes, for example, Ethernet adaptors and the like for converting electronic and/or optical signals received from a network to electronic form for use by the computer 120. The set of processing units 124 include one or more processing chips and/or assemblies. The memory 126 includes both volatile memory (e.g., RAM) and non-volatile memory, such as one or more ROMs, disk drives, solid state drives, and the like. The set of processing units 124 and the memory 126 together form control circuitry, which is configured and arranged to carry out various methods and functions as described herein.

In some embodiments, one or more of the components of the computer 120 can be, or can include processors (e.g., processing units 124) configured to process instructions stored in the memory 126. Examples of such instructions as depicted in FIG. 1 include a database manager 130, a partition manager 140, a projection manager 150, and a quantization manager 160. Further, as illustrated in FIG. 1, the memory 126 is configured to store various data, which is described with respect to the respective managers that use such data.

The database manager 130 is configured to obtain and store database data 132. In some implementations, the database manager 130 receives the database data 132 over a network. In some implementations, the database manager 130 obtains the database data 132 from a disk connected locally to the computer 120.

The database data 132 represents contents of a database obtained by the database manager 130. The database may be a SQL or NoSQL database. In some implementations, the database takes the form of a recommendation system such as that found in a streaming movie service. In some implementations, the database takes the form of an image classification service, for classifying items such as pictures, videos, and streaming content. In some implementations, the database takes the form of a natural language processing system. As shown in FIG. 1, the database data 132 includes database element data 134 and direction data 136.

The database element data 134 represents database elements of the database. The database elements are each represented in the memory 126 as a vector in a multidimensional space. In some implementations, in which the database takes the form of a recommendation system, each database element can represents a file in a library of items. The items may be images. The items may be videos. The items may be products. The items may be documents. The elements of a vector representing a movies may include characteristics such as genre, year of release, author, cast, length, and the like.

The direction data 136 represents a unit vector in a direction about which quantities based on the database elements may be projected. For example, it is about this direction that defines parallel and perpendicular components of a residual of a database element. In some implementations, the direction is chosen such that a quantization error (i.e., a difference between the full inner product and the approximate inner product computed using the quantizations described herein) is minimized. In some implementations, the direction corresponding to a partition is equal to a unit vector in the direction of the center element of the partition.

The partition manager 140 is configured to define partitions of the database, represented by partition data 142. In some implementations, the partition manager 140 defines such partitions of the database based on a vector quantization of the database.

The partition data 142 represents the partitions defined by the partition manager 140 and includes database element data 144, codeword data 146, and residual data 148. In some implementations, the direction data 136 includes a respective direction unit vector for each partition.

The database index data 144 includes indices representing the partitions. In some implementations, the database index data 144 includes whole numbers identifying the partitions. The database index data 144 also includes, for each partition, the database elements x of the database that are closest to a center point of the partition.

The codeword data 146 represents the codewords $c_i$ of a codebook C from the vector quantization of the database elements of the database. Each codeword of the codeword data 146 is a center element of a partition.

The residual data 148 represents residuals for each database element. A residual in a partition is a difference between a database element of the partition and the center point of the partition. That is, the residual $r_x = x - c_i$ for any x in the $i^{th}$ partition.

The projection manager 150 is configured to generate projection data 152 by applying projection operators to residuals (i.e., residual data 148) in each partition. The projection operators generate components of the residual parallel to and perpendicular to the direction (i.e., direction data 136).

The projection data 152 represents the components of the residuals in each partition parallel (154) to and perpendicular (156) to the direction (e.g., the respective direction unit vector of each partition). In some implementations, the projection operators are based on the direction unit vector for the partition. In some implementations, the parallel projection operator can be expressed as $H_v^{\parallel} = vv^T$ and the perpendicular projection operator can be expressed as $H_v^{\perp} = I - vv^T$, where T denotes a transpose and I denotes a unit matrix. Accordingly, in such an implementation, the residual of a database item x may be expressed as $r_x = H_v^{\parallel} r_x + H_v^{\perp} r_x$, with the first term being the parallel component of the residual (i.e., parallel component data 154) and the second term being the perpendicular component of the residual (i.e., perpendicular component data 156).

The quantization manager 160 is configured to apply various quantization techniques to the parallel and perpendicular components 154 and 156 to produce quantized data 162. The various quantization techniques include scalar quantization, uniform quantization, vector quantization, product quantization, and multiscale quantization. The quantized data 162 includes first quantized component data 164 and second quantized component data 166.

The first quantized component data 164 includes results of quantizing the parallel components of the residuals for each partition. In some implementations, the quantization manager 160 applies a scalar quantization to the parallel components of the residuals to produce the first quantized component data 164. In some implementations, the quantization manager 160 applies a uniform quantization to a quantity related to the parallel component of the residuals to produce the first quantized component data 164.

The second quantized component data 166 includes results of quantizing the perpendicular components of the residuals for each partition. In some implementations, the quantization manager 160 applies a multiscale quantization to the perpendicular components of the residuals to produce the second quantized component data 166. The second quantized component data 166 also includes, in some implementations, a rotation matrix and, for each partition, a respective scale factor for that partition.

Figure 2:
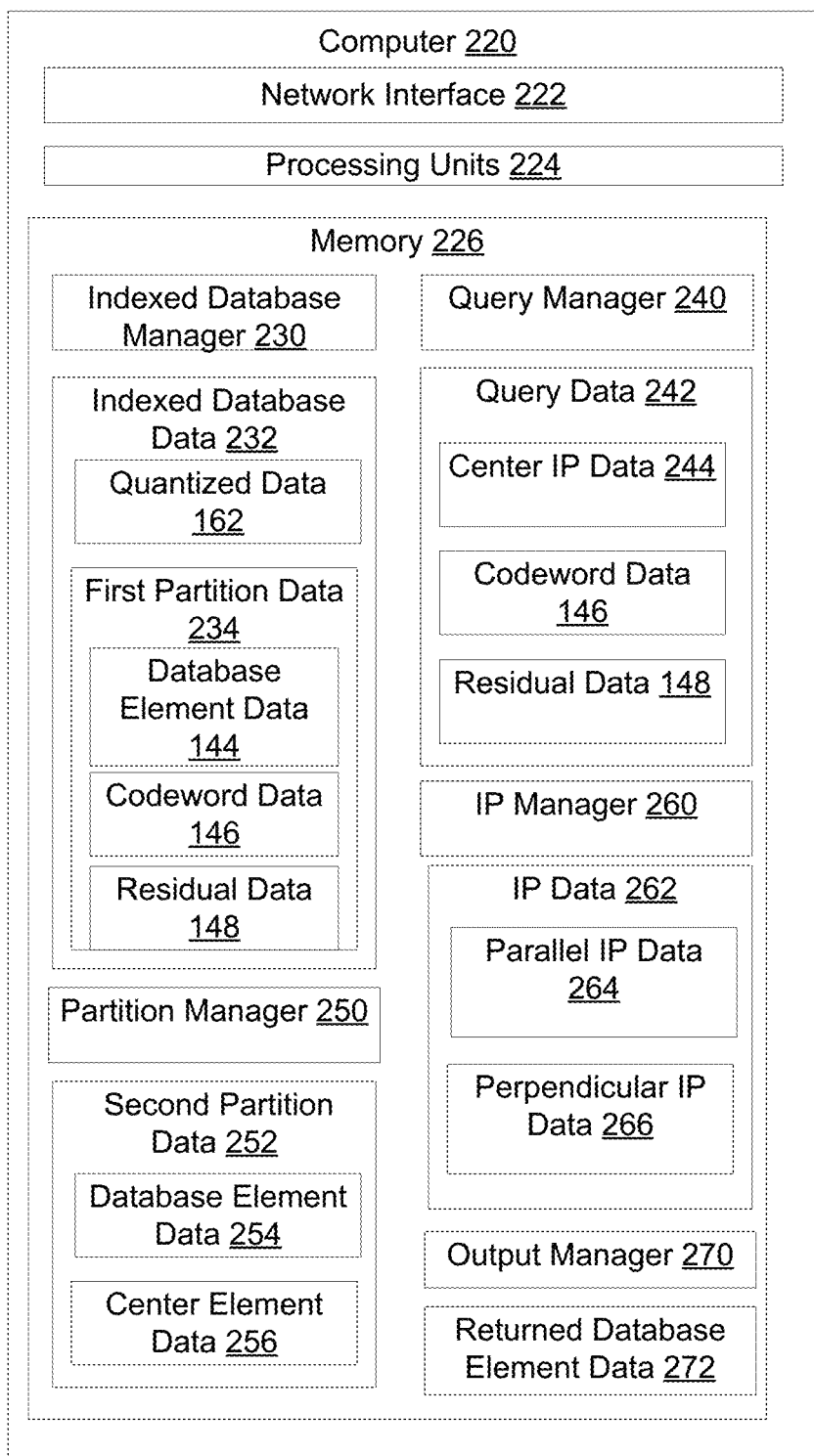
FIG. 2 is a diagram that illustrates a second example electronic environment for implementing improved techniques described herein.

FIG. 2 is a diagram that illustrates an example electronic environment 200 in which the above-described improved techniques may be implemented. As shown, in FIG. 2, the example electronic environment 200 includes a computer 220. In some implementations, the computer 220 is the same as the computer 120.

The computer 220 is configured to process a query. The computer 220 includes a network interface 222, one or more processing units 224, and memory 226. The network interface 222 includes, for example, Ethernet adaptors and the like for converting electronic and/or optical signals received from a network to electronic form for use by the computer 220. The set of processing units 224 include one or more processing chips and/or assemblies. The memory 226 includes both volatile memory (e.g., RAM) and non-volatile memory, such as one or more ROMs, disk drives, solid state drives, and the like. The set of processing units 224 and the memory 226 together form control circuitry, which is configured and arranged to carry out various methods and functions as described herein.

In some embodiments, one or more of the components of the computer 220 can be, or can include processors (e.g., processing units 224) configured to process instructions stored in the memory 226. Examples of such instructions as depicted in FIG. 2 include an indexed database manager 230, a query manager 240, a partition manager 250, an inner product manager 260, and an output manager 270. Further, as illustrated in FIG. 2, the memory 226 is configured to store various data, which is described with respect to the respective managers that use such data.

The indexed database manager 230 is configured to obtain and store indexed database data 232. In some implementations, the indexed database manager 230 receives the indexed database data 232 over a network. In some implementations, the indexed database manager 230 obtains the indexed database data 232 from a disk connected locally to the computer 220.

The indexed database data 232 represents the indexed database created with an inverted file. The indexed database data 232 includes the quantized data 162. The indexed database data 232 also includes first partition data 234, which is the same as the partition data 142, which includes the database element data 144, the codeword data 146, and the residual data 148.

The query manager 240 is configured to receive a query and perform preprocessing steps based on the query. In some implementations, the query manager 240 receives the query over a network. In some implementations, the query manager 240 receives the query via a local input device.

The query data 242 represents preprocessed quantities based on the received query. The query data 242 includes the codeword data 146 used to define the first partition data 234, the residual data 148, and center inner product (IP) data 244. The center IP data 244 is generated by the query manager 240 and represents inner products of the query vector and the center point of each of the partitions represented by the first partition data 234. The center IP data 244 is used to select a smaller set of partitions for analysis, ultimately to return a specified number of database items.

The partition manager 250 is configured to select a specified number of partitions from those represented by the first partition data 234. The selection is based on the center IP data 244. In some implementations, the partition manager 250 generates center inner products, defined as inner products of the query vector and the center point of each of the partitions represented by the first partition data 234. The partition manager 250, in such implementations, then selects a specified number of the largest center inner products to produce second partition data 252.

The second partition data 252 represents partitions corresponding to the center points that produce the specified number of the largest center inner products. These are the partitions from which inner products with residuals will be estimated and database elements ultimately returned. As with the first partition data 234, the second partition data 252 includes database element data 254 and center element data 256 that defines the center element of each partition represented by the second partition data 252.

The IP manager 260 is configured to generate estimates of the IPs of the query represented by the query data 242 and the residuals of the database elements of the partitions represented by the second partition data 252 to produce IP data 262. Further details concerning the estimates of the inner products are described with regard to FIGS. 7 and 8. The estimates of these IPs, in combination with the center IPs, provide a metric for selecting database items to be presented to a user in response to a query from the user.

The IP data 262 represents the estimated IPs of the query with the residuals of the database elements of the partitions represented by the second partition data 252. As described above, the residuals are split into parallel and perpendicular components, with each component quantized using a different quantization technique. Accordingly, the IPs of the query and the residuals are similarly split into parallel IP data 264 and perpendicular IP data 266, and the nature of the quantizations implies that the inner products will be approximations.

The output manager 270 is configured to return a specified number of database items represented by returned database element data 272 corresponding to the largest net IPs. The net IP for a database element of a partition is equal to the sum of the center IP for the partition and the parallel IP and the perpendicular IP for the database element.

It is understood that the electronic environments 100 and 200 are examples of such electronic environments. In some implementations, one or both of the electronic environments 100 and 200 include a computing system distributed across several computing systems. In such an implementation, the components and/or data of such systems may be combined or used separately.

Figure 3:
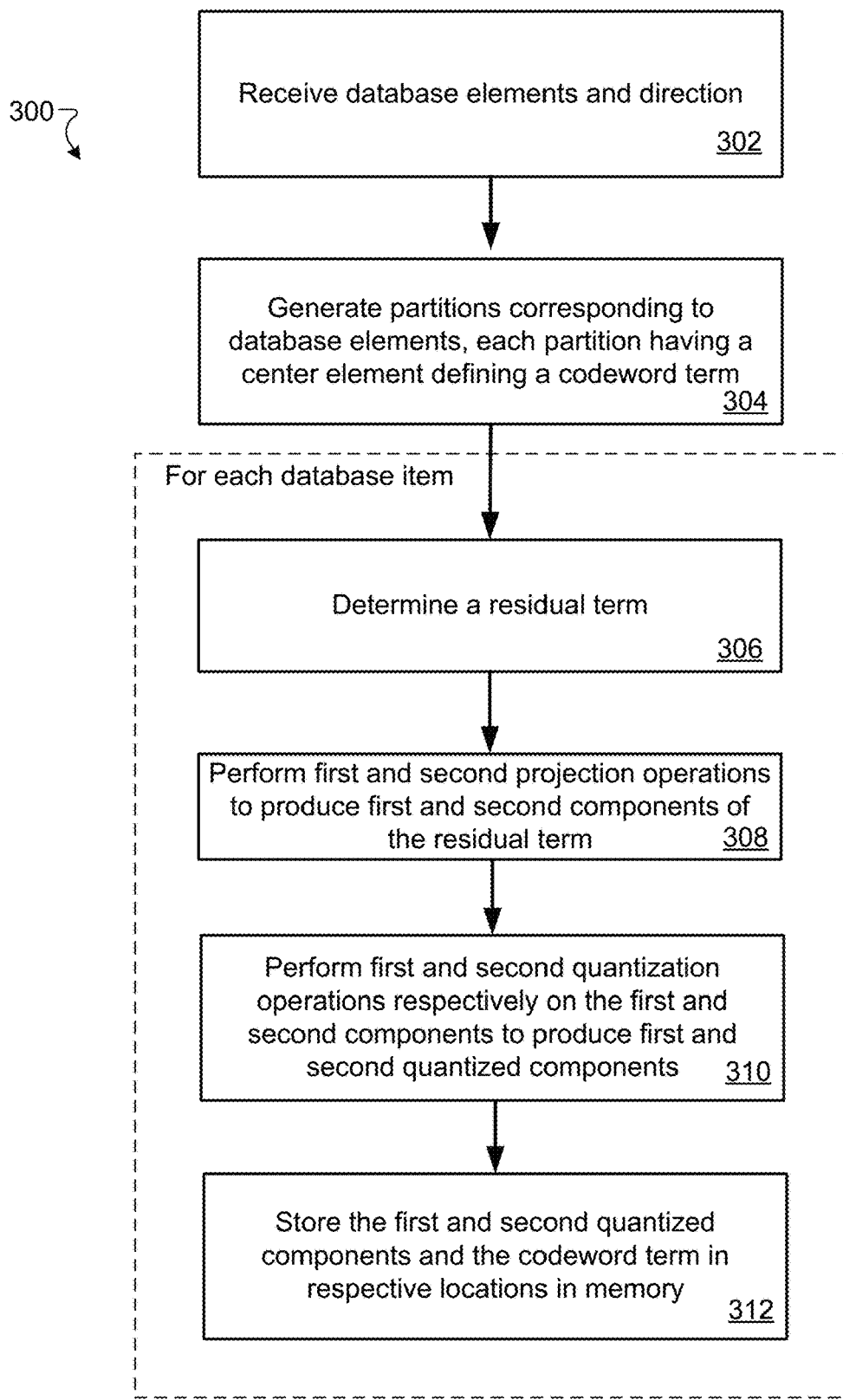
FIG. 3 is a diagram that illustrates an example method of performing the improved techniques within the electronic environment shown in FIG. 1.

FIG. 3 is a flow chart depicting an example method 300 of encoding triangular mesh data. The method 300 may be performed by software constructs described in connection with FIG. 1, which reside in memory 126 of the computer 120 and are run by the set of processing units 124.

At 302, the database manager 130 receives a plurality of database elements (e.g., database element data 134) and direction data 136 indicating a direction. In some implementations, the direction data 136 is based on codewords from a codebook of a vector quantization used in performing an inverted file operation. As described above, in some implementations, the direction varies with partition and is equal to the direction of the center point of a partition. In some implementations, receiving the direction includes calculating the direction. In some implementations, receiving the direction includes calculating the direction for each partition. Each database element is represented by a vector in a multidimensional space.

At 304, the partition manager 140 generates a plurality of partitions (e.g., partition data 142) based on the plurality of database elements. Each of the plurality of partitions corresponds to a respective subset of the plurality of database elements (e.g., database element data 144) and includes a respective center element. The respective center element of a partition of the defines a codeword (e.g., codeword data 146). In some implementations, the partition manager 140 generates partitions using techniques such as clustering techniques like K-D trees, nearest neighbor, and the like.

At 306, the partition manager 140 determines, for each database element of the plurality of database elements, a residual term (e.g., residual data 148). The residual term is a difference between the database element and the center element for the partition to which the database element is assigned.

At 308, the projection manager 150 performs, on each residual term, a first projection operation on the residual term using a first projection operator to produce a first component of the residual term (e.g., parallel component data 154) and a second projection operation on the residual term using a second projection operator to produce a second component of the residual term (e.g., perpendicular component data 156). The first projection operator and the second projection operator are based on the direction, as explained below with regard to FIGS. 7 and 8. The first component is parallel to the direction, the second component is perpendicular to the direction.

At 310, the quantization manager 160 performs a first quantization operation on the first component to produce a first quantized component (e.g., first quantized component data 164) and a second quantization operation on the second component to produce a second quantized component (e.g., second quantized component data 166), the second quantization operation being different from the first quantization operation.

At 312, the computer 120 stores the first quantized component, the second quantized component, and the codeword term in respective locations in a memory. The first quantized component, the second quantized component, and the codeword term may provide a similarity measure of the database. The similarity measure may be used to identify items similar to a query item.

Figure 4:
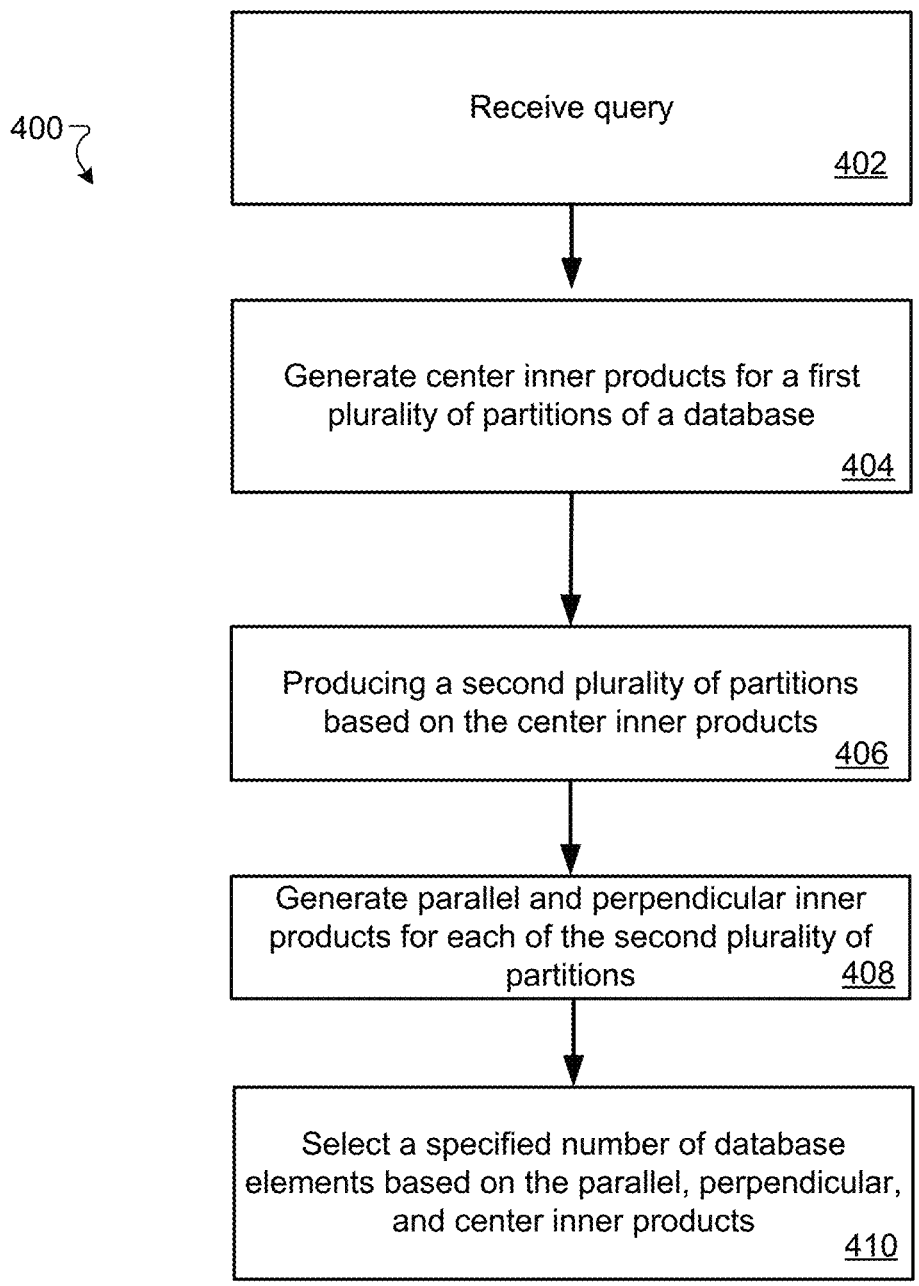
FIG. 4 is a diagram that illustrates an example method of performing the improved techniques within the electronic environment shown in FIG. 2.

FIG. 4 is a flow chart depicting an example method 400 of processing a query. The method 400 may be performed by software constructs described in connection with FIG. 2, which reside in memory 226 of the computer 220 and are run by the set of processing units 224.

At 402, the query manager 240 receives query data 242 representing a query from a user. The query in turn is represented as a vector in a multidimensional space, having the same dimension as the vectors representing the database elements of the database.

At 404, the query manager 242 generates, for each of a first plurality of partitions of a database having database elements (e.g., first partition data 234), a center inner product of the query and a respective center point of that partition to produce a plurality of center inner products (e.g., center IP data 244).

At 406, the partition manager 250 selects a first number of the first plurality of partitions to produce a second plurality of partitions (e.g., second partition data 252), the selecting being based on the plurality of center inner products. In some implementations, the selecting is based on selecting a specified number of the partitions with which the query has the largest center inner products.

At 408, the IP manager 260 generates, for each database element in each of the second plurality of partitions, a parallel inner product (e.g., parallel IP data 264) and a perpendicular inner product (e.g., perpendicular IP data 266). The parallel inner product is an inner product between the first quantized component for the query data and a first quantized component of the database element. The perpendicular inner product is an inner product between the second quantized component for the query data and a second quantized component for the database element.

At 410, the output manager 270 selects and returns a specified number of database elements to the user based on sums of the parallel IPs, perpendicular IPs, and the center IPs.

The conventional approaches to processing a query q described above include an inverted file and asymmetric distance computation (IVFADC) framework, which combines vector quantization (VQ) for coarse partitioning and product quantization (PQ) for residual quantization. Specifically, an inverted file (IVF) is generated using a VQ partitioning, where the VQ has a codebook C. Each VQ partition $P_i$ includes all database elements x of a database X whose closest VQ center is $c_i$, i.e., $$P_i = \{x \in X \mid c_i = \underset{c \in C}{\operatorname{argmin}} \|x - c\|_2\}.$$

In such a conventional approach, residual vectors $\{r_x = x - c_i\}_{x \in P_i}$ are further quantized with PQ; the quantized approximation of the residual $r_x$ is denoted as $\phi_{PQ}(r_x)$. Moreover, asymmetric distance computation (ADC) refers to an efficient table lookup algorithm that generates an approximate inner product (IP). That is, for VQ, ADC $(q, \phi_{VQ}(x))$=lookup $(\{q \cdot c\}_{c \in C}, \text{index}(\phi_{VQ}(x)))$. For PQ with multiple subspaces, the IP of the query q with the residual $r_x$ is $$q \cdot r_x \approx q \cdot \phi_{PQ}(r_x) = ADC(q, \phi_{PQ}(r_x)) = \sum_{i \in [n_B]} ADC^{(i)}(q^{(i)}, \phi_{VQ}^{(i)}(r_x^{(i)})),$$

where $n_B$ is the number of codebooks used in PQ. When processing a query q, IVF is used to determine the top partitions according to $q \cdot c_i$. The top $m_{ADC}$ partitions are selected to search into; ADC is then applied to the residuals in those top $m_{ADC}$ partitions.

In the IVFADC framework, it is noted that once the VQ partitions are fixed, the end quality of the IP approximation depends crucially on the joint distribution of the query q that has a maximum IP with the center $c_i(x)$ and residual $r_x = x - c_i(x)$, where $c_i(x)$ is the center of the partition $P_i$ to which database item x is assigned. The conventional approaches to processing the query q involved approximating $q \cdot r_x$ by quantizing $r_x$ as an unconditional distribution on $c_i(x)$. Nevertheless, a close analysis of the IP $q \cdot r_x$ shows that the variance of the IP is distributed non-uniformly over direction v.

The direction v is a unit vector and the projected IP between the query q and the residual $r_x$ on direction v is defined as $q^T(vv^T r_x) = (v^T q)^T (v^T r_x) = (q \cdot v)(r_x \cdot v)$. Within a partition $P_i$, the projected IP variance is defined as $$\operatorname{var}(v) = \frac{1}{|P_i|} \sum_{x \in P_i} ((q \cdot v)(r_x \cdot v))^2.$$

Figure 5:
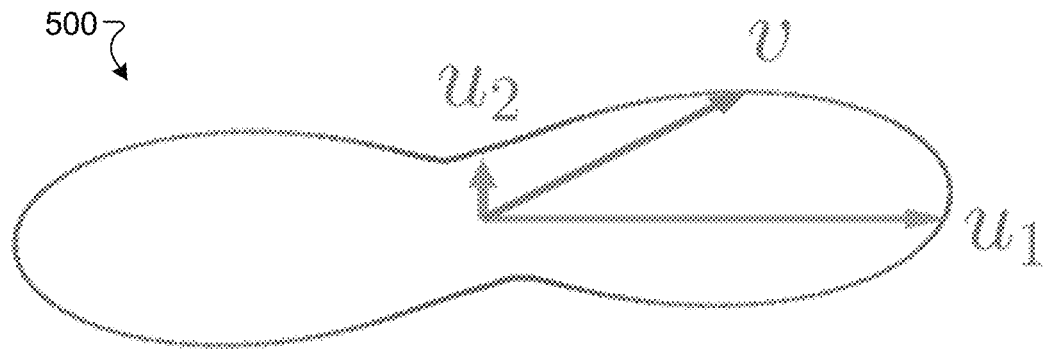
FIG. 5 is a diagram that illustrates an example behavior of projected inner product variance with direction.

The importance of the projected IP variance is described with regard to FIG. 5.

FIG. 5 is a diagram that illustrates a plot 500 of an example behavior of projected IP variance with direction. In the plot 500, the query q is given and accordingly its top (i.e., most similar) partition $P_q^*$ and its corresponding center $c_q^*$. In the example of FIG. 5, a first direction $u_1 = c_q^*/\|c_q^*\|_2$ and a second direction $u_2$ orthogonal to $u_1$ are selected. 1000 evenly spaced directions in the subspace spanned by $$(u_1, u_2) \text{ as } \{v_j = \cos(2j\pi/n_v)u_1 + \sin(2j\pi/n_v)u_2\}_{[n_v]}$$

are generated. The 1000 evenly spaced directions may be denoted as $n_v$. The plot 500 is a plot of the points $$\{\operatorname{var}(v_j)\cos(2j\pi/n_v), \operatorname{var}(v_j)\sin(2j\pi/n_v)\}_{[n_v]},$$

i.e., the distance between each point and the origin represents the projected IP variance on its respective direction. The elongated peanut shape clearly demonstrates that the variance of the projected IPs is more concentrated on some directions than others, i.e., the projected IP has a nonuniform variance over direction.

Figure 6:
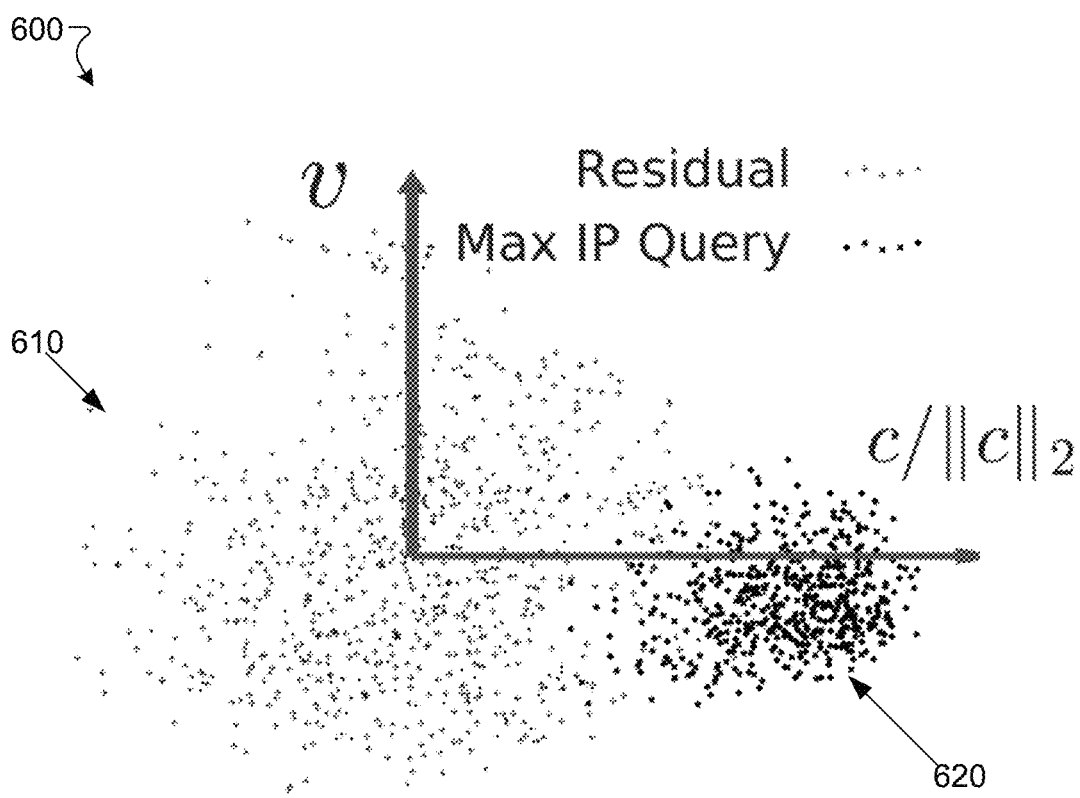
FIG. 6 is a diagram that illustrates an example behavior of residuals and queries in a partition with respect to direction.

FIG. 6 is a diagram that illustrates a scatter plot 600 an example behavior of residuals and queries in an example partition 610 with respect to direction. For the plot 600, a partition is given. The residuals in the partition 610 and a sample of queries that have maximum IPs with the partition center 620 are shown in plot 600. All residuals and queries with maximum IPs are projected onto the two-dimensional subspace spanned by the partition center direction and the first principal (i.e., orthogonal) direction of the residuals. The residuals 610 (blue) are scattered uniformly in this subspace. In contrast, the queries 620 (black) are more concentrated along the direction of the partition center $c_q^*/\|c_q^*\|_2$.

Figure 7:
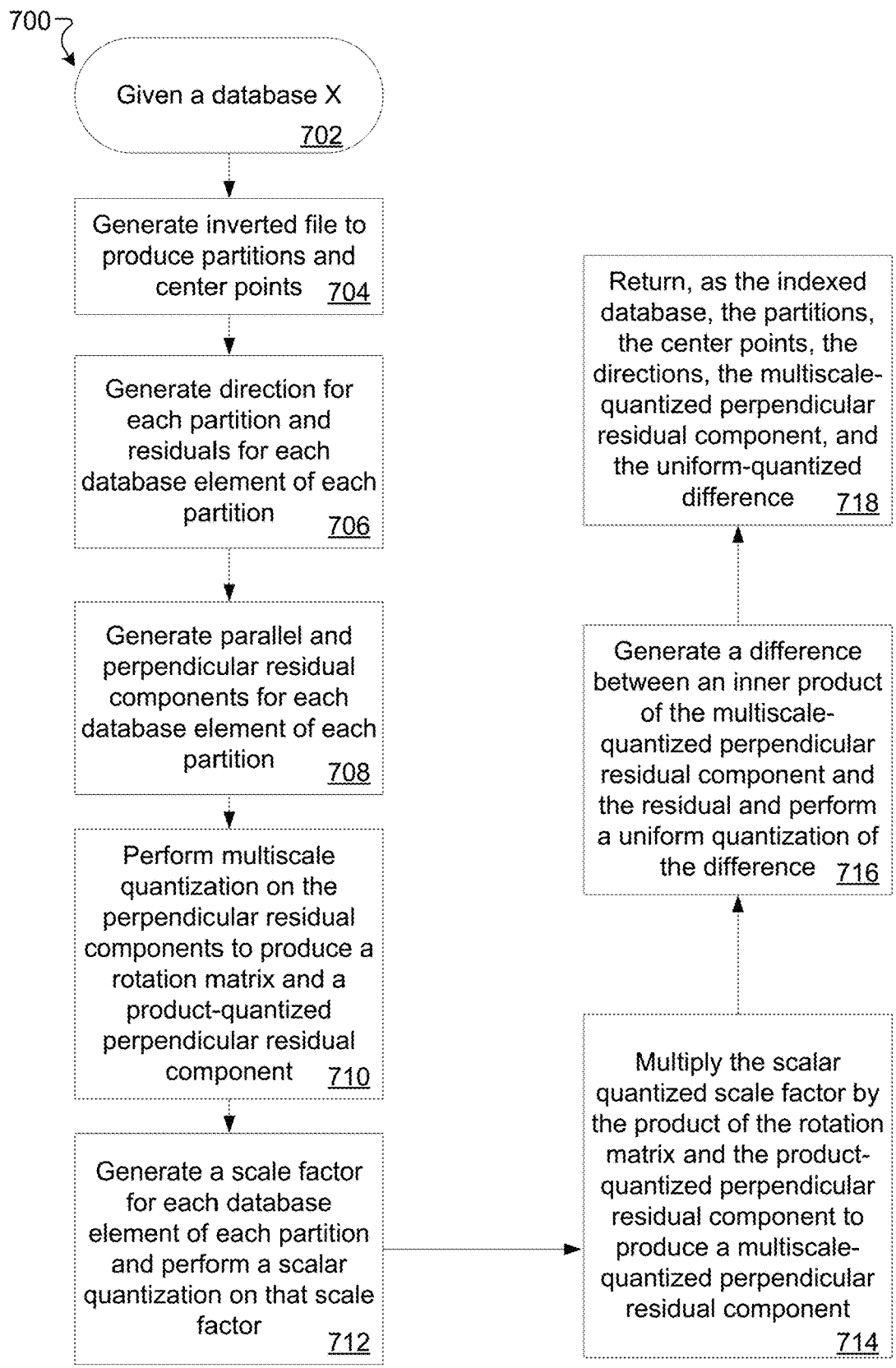
FIG. 7 is a flow chart that illustrates an example database indexing process within the electronic environment shown in FIG. 1.

FIG. 7 is a flow chart that illustrates an example process 700 of database indexing. The process 700 may be performed by software constructs described in connection with FIG. 1, which reside in memory 126 of the computer 120 and are run by the set of processing units 124.

At 702, a database X is given. The database X includes a plurality of database elements x obtained by the database manager 130, each database element being represented by a vector in a multidimensional space.

At 704, the partition manager 140 generates an inverted file to produce the partitions $\{P_i\}_{[m]}$ and the corresponding center points $\{c_i\}_{[m]}$.

At 706, the partition manager 140 generates a direction $\{v_i\}_{[m]}$ corresponding to each partition and residuals $r_x$ for each database element x of each partition. In some implementations, the direction $v_i = c_i / \|c_i\|_2$ for the partition $P_i$.

At 708, the projection manager 150 generates parallel and perpendicular residual components for each database element of each partition. This is referred to as Local Orthogonal Decomposition (LOD). In some implementations, the projection manager 150 generates a parallel projection matrix $H_v^\|$ and a compliment projection matrix $H_v^\perp$ for the partition. For example, given a unit norm direction vector v such that $\|v\|_2 = 1$, the parallel projection matrix and the compliment projection matrix may be expressed as $$H_v^\| = vv^T, H_v^\perp = I - vv^T,$$

where I is the unit matrix. $H_v^\|$ is a projection matrix onto a direction parallel to v and $H_v^\perp$ is a projection matrix onto its complement subspace, i.e., onto a direction perpendicular to v. A residual may then be decomposed as $r_x = H_v^\| r_x + H_v^\perp r_x$, i.e., as the sum of a parallel residual component and a perpendicular residual component.

At 710, the quantization manager 150 performs a multi-scale quantization on the perpendicular residual components to produce a rotation matrix and a product-quantized perpendicular residual component. Multiscale quantization (MSQ) is described in [white paper ref.], which is incorporated by reference herein in its entirety. At 712, the quantization manager 150 generates a scale factor for each database element of each partition and performs a scalar quantization (SQ) on that scale factor.

To simplify the notation, define $o_x^v = H_v^\perp r_x$ and $\hat{o}_x^v = o_x^v / \|o_x^v\|_2$. In the above-cited reference, MSQ learns a separate scale factor and rotation matrix that are multiplied to the product-quantized residual as $\lambda_x R \phi_{PQ}(\hat{o}_x^v)$, where R is a rotation matrix and $\phi_{PQ}$ is the PQ learned from the normalized perpendicular components. Herein, the scale is chosen differently than in the above-cited reference. In some implementations, the scale is chosen to preserve the $\ell_2$ norm of the perpendicular component $o_x^v$ rather than the whole residual $r_x$. That is, $$\|\lambda_x H_v^\perp \phi_{PQ}(\hat{o}_x^v)\|_2 = \|o_x^v\|_2.$$

The rotation matrix R is not included in the above expression because it does not affect the $\ell_2$ norm. Another SQ is learned on the scale factor $\lambda_x$ to further reduce storage cost and speed up the ADC.

At 714, the scalar-quantized scale factor is multiplied by the rotation matrix and the product-quantized perpendicular residual component to produce a multiscale-quantized perpendicular residual component. The MSQ of the perpendicular residual component is $$\phi_{MSQ}(o_x^v) = \phi_{SQ}(\lambda_x) R \phi_{PQ}(\hat{o}_x^v),$$

where, in some implementations, $\phi_{SQ}$ is a non-uniform SQ for the partition $P_i$ learned via a Lloyd algorithm. In some implementations, the number of codewords in the SQ codebook is as small as 16. In such implementations, the storage cost may be negligible.

At 716, the quantization manager 160 generates a difference between an IP of the multiscale-quantized perpendicular residual component $\phi_{MSQ}(o_x^v)$ and the residual $r_x$ and performs a uniform quantization (UQ) of the difference. That is, define the following quantity as the difference: $z_x^v = (r_x - \phi_{MSQ}(o_x^v)) \cdot v$. Then it is proposed to learn a UQ:

$$\phi_{UQ}(z_x^v; a_P, b_P) = a_P \text{round}\left(\frac{z_x^v - b_P}{a_P}\right) + b_P,$$

where $a_P = (z_{max} - z_{min})/(2^{l_{UQ}} - 1)$, $b_P = (z_{max} + z_{min} + a_P)/2$, $z_{max}$ and $z_{min}$ are the maximum and minimum of the finite input set $\{z_x^v | x \in P_i\}$, and $l_{UQ}$ is the number of bits for UQ. In some implementations, the requirement that $z_{max}$ be the maximum of that finite input set is relaxed to be the 99% quantile and that $z_{min}$ be the minimum of the finite input set is relaxed to be the 1% quantile. In some implementations, rounded outputs are clipped to within the interval $[-2^{l_{UQ}-1}, 2^{l_{UQ}-1}+1]$.

An advantage of UQ over other SQ techniques is that its codebook size is independent of the number of bits used for its codes. It also enables fast computation of approximate IPs of the query and the parallel residual component.

At 718, the computer 120 stores, as the indexed database, the partitions, the center points, the directions, the multi-scale-quantized perpendicular residual component of each database element, and the uniform-quantized difference of each database element. In some implementations, the MSQ of the perpendicular residual component returns a rotation matrix and a scale factor, which are also stored.

Figure 8:
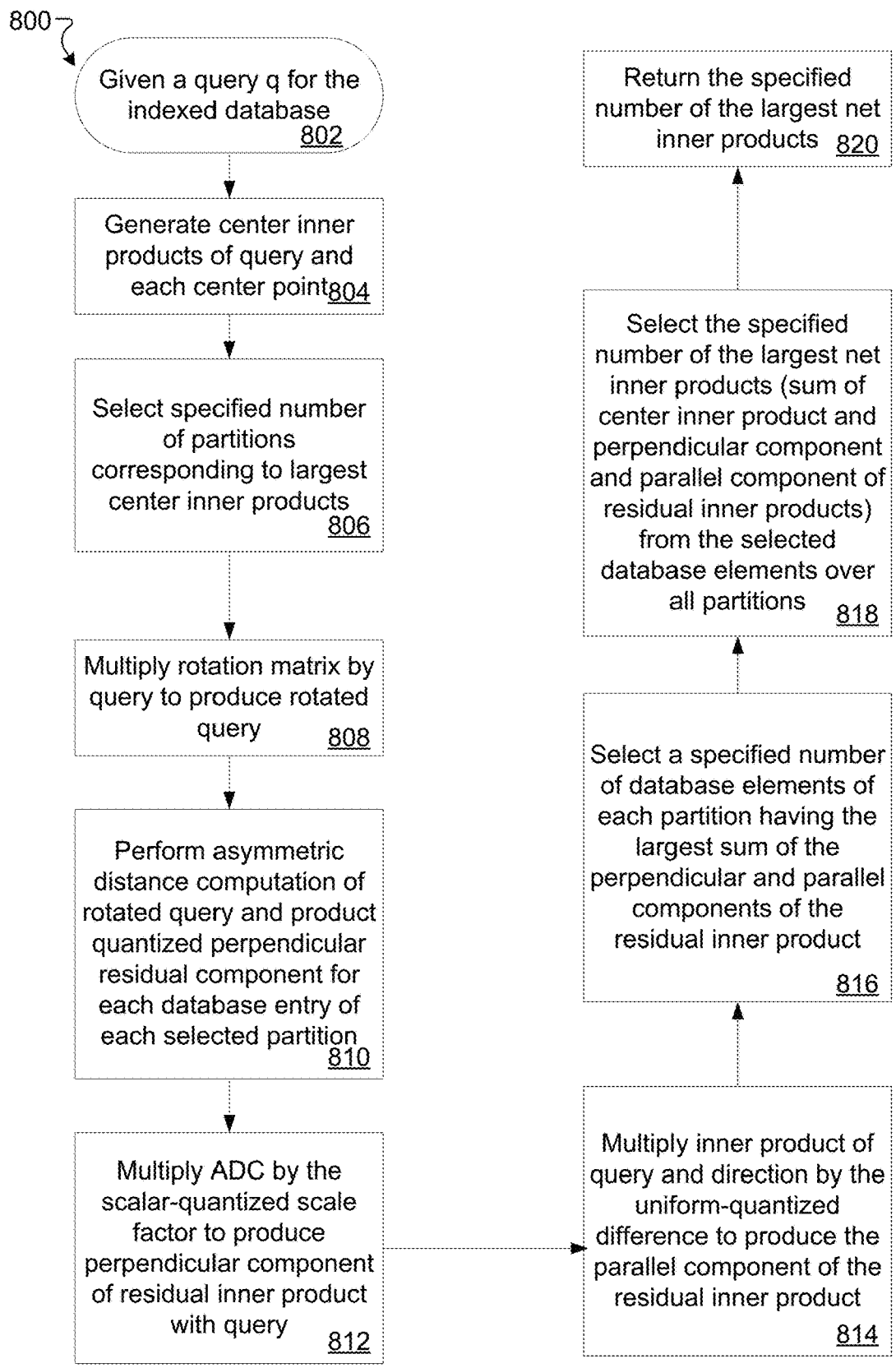
FIG. 8 is a flow chart that illustrates an example query processing within the electronic environment shown in FIG. 2.

FIG. 8 is a flow chart that illustrates an example process 800 of query processing. The process 800 may be performed by software constructs described in connection with FIG. 2, which reside in memory 226 of the user device computer 220 and are run by the set of processing units 224.

At 802, the query manager 240 receives a query q from a user. Like the database elements, the query q is represented by a multidimensional vector, having the same dimensions as the vectors representing the database elements.

At 804, the query manager 240 generates center inner products of the query q and each center point $c_i$ of each partition $P_i$. That is, for each partition $P_i$, the query manager 240 generates the quantities $q \cdot c_i = p_i$.

At 806, the partition manager 250 selects a specified number of (i.e., second plurality of) partitions C* corresponding to largest center inner products $p_i$.

At 808, the IP manager 260 multiplies the rotation matrix R by the query q to produce a rotated query $q_r = R^T q$.

At 810, the IP manager 260 performs an ADC of the rotated query $q_r$ and the product quantized perpendicular residual component $\phi_{PQ}(\hat{o}_x^v)$ for each database entry of each selected partition. That is, the IP manager 260 generates ADC $(q_r, \phi_{PQ}(\hat{o}_x^v))$.

At 812, the IP manager 260 multiplies ADC $(q_r, \phi_{PQ}(\hat{o}_x^v))$ by the scalar-quantized scale factor $\phi_{SQ}(\lambda_x)$ to produce the perpendicular component of the residual inner product with the query q. Note that $q \cdot \phi_{MSQ}(o_x^v) = q \cdot (\phi_{SQ}(\lambda_x) R \phi_{PQ}(\hat{o}_x^v)) = \phi_{SQ}(\lambda_x) ((R^T q) \cdot \phi_{PQ}(\hat{o}_x^v)) = \phi_{SQ}(\lambda_x)(q_r \cdot \phi_{PQ}(\hat{o}_x^v)) \approx \phi_{SQ}(\lambda_x)$ ADC $(q_r, \phi_{PQ}(\hat{o}_x^v))$. Note also that the generation of the rotated query needs only be performed once.

It is noted that, unlike $o_x^v$, $\phi_{MSQ}(o_x^v)$ is not orthogonal to v. In some implementations, it is desired that $q \cdot o_x^v$ be approximated in the orthogonal subspace as $q \cdot o_x^v \approx q \cdot H_v^\perp \phi_{MSQ}(o_x^v) = q \cdot \phi_{MSQ}(o_x^v) - q \cdot H_v^\| \phi_{MSQ}(o_x^v)$. A fast ADC may be performed on the term $q \cdot \phi_{MSQ}(o_x^v)$. The other term, $q \cdot H_v^\| \phi_{MSQ}(o_x^v) = (q \cdot v)(\phi_{MSQ}(o_x^v) \cdot v)$, in some implementations, is removed by subtracting it from the projected component prior to quantization.

At 814, the IP manager 260 multiplies the inner product of the query q and direction v by the uniform-quantized difference to produce the parallel component of the residual inner product. This can be seen by writing $q \cdot r_x = q \cdot H_v^\parallel r_x + q \cdot o_x^v \approx (q \cdot v) \phi_{UQ}(z_x^v; a_P, b_P) + q \cdot \phi_{MSQ}(o_x^v)$. The parallel component is the former term.

At 816, the output manager 270 selects a specified number of database elements of each partition having the largest sum of the perpendicular and parallel components of the residual inner product.

At 818, the output manager 270 selects the specified number of the largest net inner products (sum of center inner product and perpendicular component and parallel component of residual inner products) from the selected database elements over all partitions.

At 820, the output manager 270 returns the specified number of database elements corresponding to the largest net inner products.

The novel MIPS techniques described above were tested with two experimental data. The first set, a Netflix dataset, is generated with a regularized matrix factorization. The second set, a Glove dataset, is a publicly available dataset from a natural language system. For word embeddings, the cosine similarity between these embeddings reflects their semantic relatedness. Accordingly, the Glove dataset was $\ell_2$-normalized. The details of the experiments using these two datasets is summarized in Table 1:

TABLE 1

| Datasets used for MIPS experiments | | |
|---|---|---|
| Dataset | # Vectors | # Dims |
| Netflix | 17,700 | 200 |
| Glove | 1,183,514 | 200 |
| m | $m_{ADC}$ | $m_{ADC}/m$ |
| 20 | 2 | 10% |
| 1000 | 100 | 10% |

The following algorithms are applied to both datasets:

MIPS-PQ: implements the PQ scheme proposed in the original IVFADC framework.

MIPS-OPQ: implements an optimized product quantization (OPQ) scheme that learns a global rotation matrix.

L2-OPQ: implements the OPQ scheme and also a MIPS to $\ell_2$-nearest neighbor search (NNS) conversion. This is not applied to the Glove dataset because $\ell_2$-NNS retrieves the same set of database vectors as MIPS after normalization.

MIPS-LOD-MSQ: implements the above-described improved techniques using both LOD and MSQ. The projection direction is set to the partition center as an effective approximation to the optimal direction.

Parameters are set to the following values for all recall experiments:

IVF: average partition size is set at about 1,000 and 10% of the partitions are searched with ADC.

PQ: there are either 25 or 50 codebooks, each of which includes 16 codewords for PQ and OPQ. For LOD+MSQ, the number of codewords is either 23 or 48 when $l_{UQ}=8$ and either 24 or 49 when $l_{UQ}=4$. This keeps the number of bits spent on each database vector the same. The number of codewords is fixed at 16.

UQ: there are $l_{UQ}=8$ bits for UQ for Netflix and $l_{UQ}=4$ for Glove, which results in 256 and 16 levels in the codebook, respectively.

MSO: there are $l_{SQ}=4$ bits and accordingly 16 levels for SQ of scale factors in MSQ for all experiments.

Figure 9A:
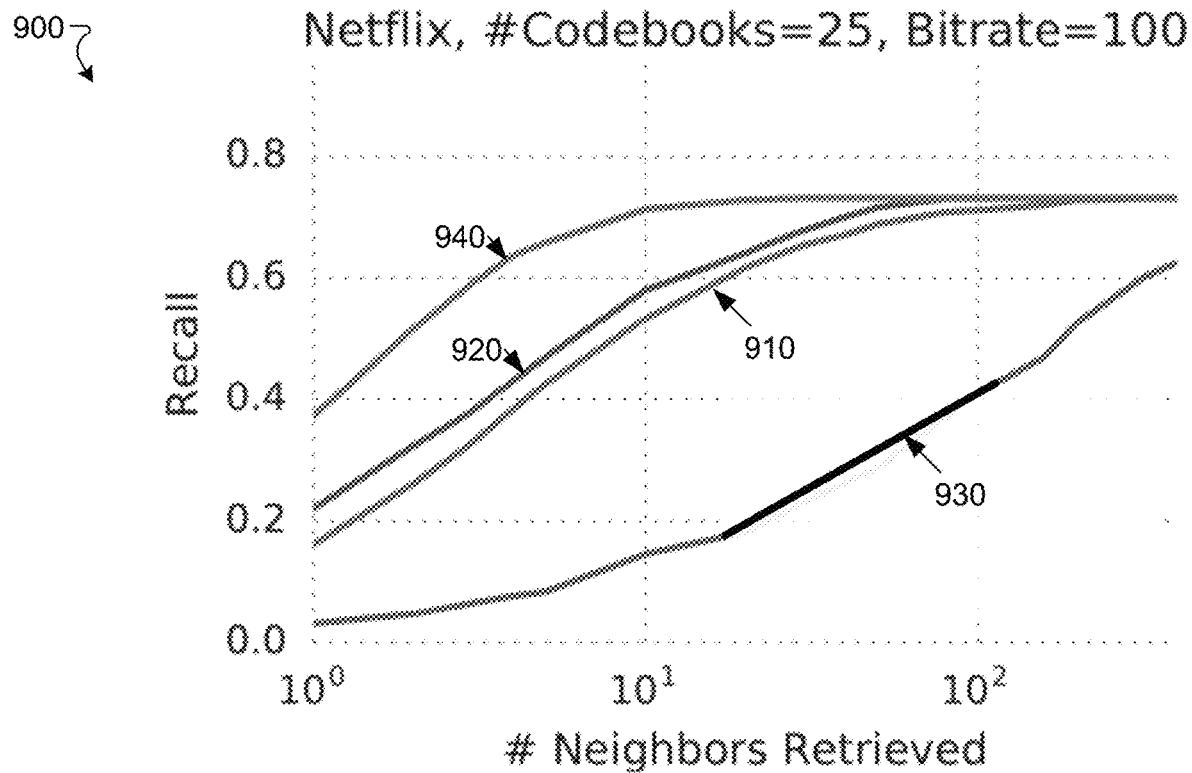
FIGS. 9A and 9B are diagrams illustrating example recall results within the electronic environments shown in FIGS. 1 and 2.

FIG. 9A is a diagram illustrating example recall results in the form of a plot 900, corresponding to the Netflix dataset with 25 codebooks and a bitrate of 100. The plot 900 shows curves 910 corresponding to MIPS-PQ, 920 to MIPS-OPQ, 930 to L2-OPQ, and 940 to MIPS-LOD-MSQ.

Figure 9B:
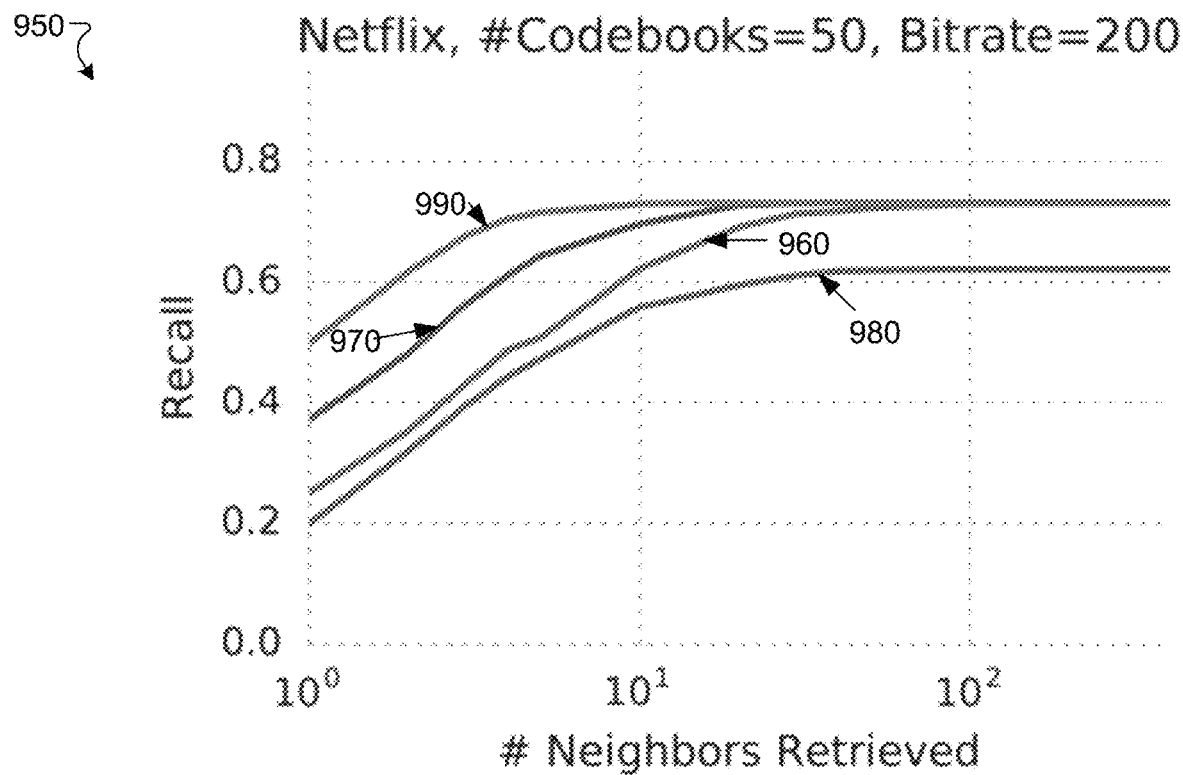

FIG. 9B is a diagram illustrating example recall results in the form of a plot 950, corresponding to the Netflix dataset with 50 codebooks and a bitrate of 200. The plot 950 shows curves 960 corresponding to MIPS-PQ, 970 to MIPS-OPQ, 980 to L2-OPQ, and 990 to MIPS-LOD-MSQ.

Figure 10A:
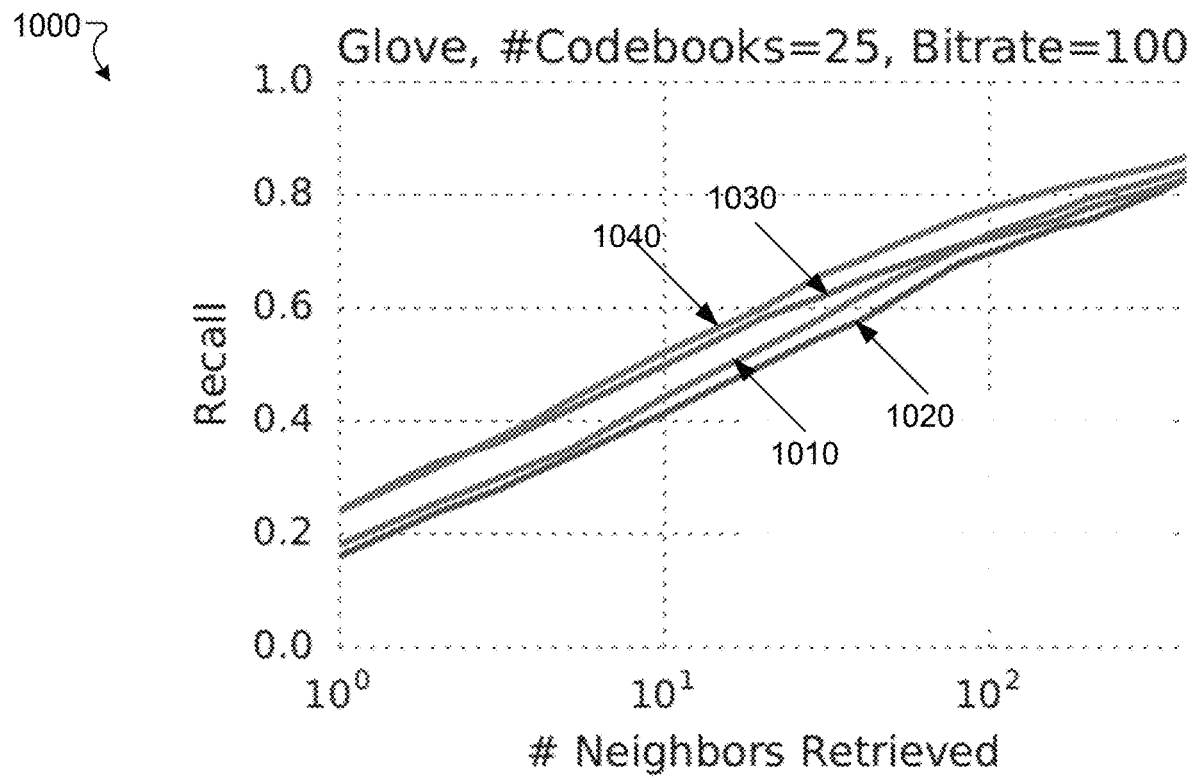
FIGS. 10A and 10B are diagrams illustrating example recall results within the electronic environments shown in FIGS. 1 and 2.

FIG. 10A is a diagram illustrating example recall results in the form of a plot 1000, corresponding to the Glove dataset with 25 codebooks and a bitrate of 100. The plot 1000 shows curves 1010 corresponding to MIPS-PQ, 1020 to MIPS-OPQ, 1030 to L2-OPQ, and 1040 to MIPS-LOD-MSQ.

Figure 10B:
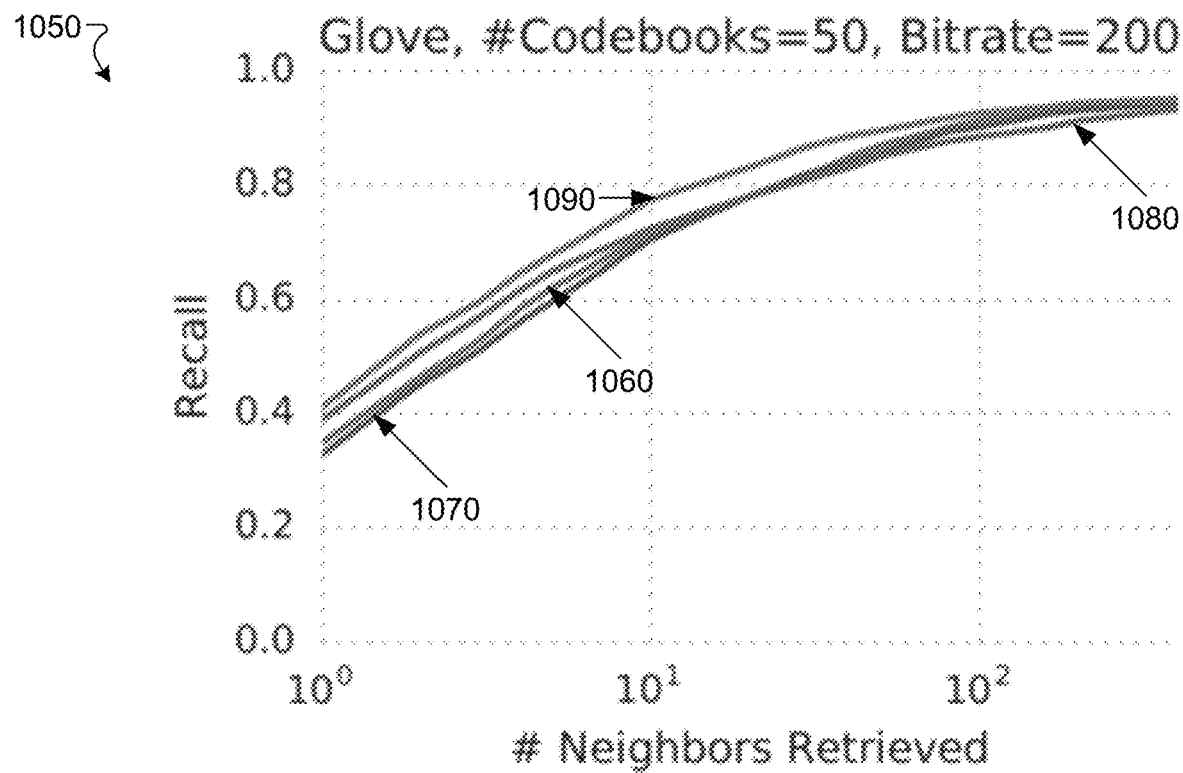

FIG. 10B is a diagram illustrating example recall results in the form of a plot 1050, corresponding to the Glove dataset with 50 codebooks and a bitrate of 200. The plot 1050 shows curves 1060 corresponding to MIPS-PQ, 1070 to MIPS-OPQ, 1080 to L2-OPQ, and 1090 to MIPS-LOD-MSQ.

In all of the experimental results shown in FIGS. 9A, 9B, 10A, and 10B, disclosed implementations (the MIPS-LOD-MSQ) consistently outperforms the other existing techniques using the same bitrate. Its relative improvement is higher for Netflix because the residual norms of the Netflix dataset exhibit larger variance than the Glove dataset.

To systematically investigate the contribution of LOD and MSQ in isolation, an ablation study was performed with both datasets:

MIPS-OPQ: repeated from the previous experiments.

MIPS-LOD-MSQ: repeated from the previous experiments.

MIPS-MSQ: implements the MSQ scheme directly on the residuals without LOD.

MIPS-LOD-OPQ: first applies LOD and then implements the OPQ scheme on the perpendicular residual component.

Figure 11A:
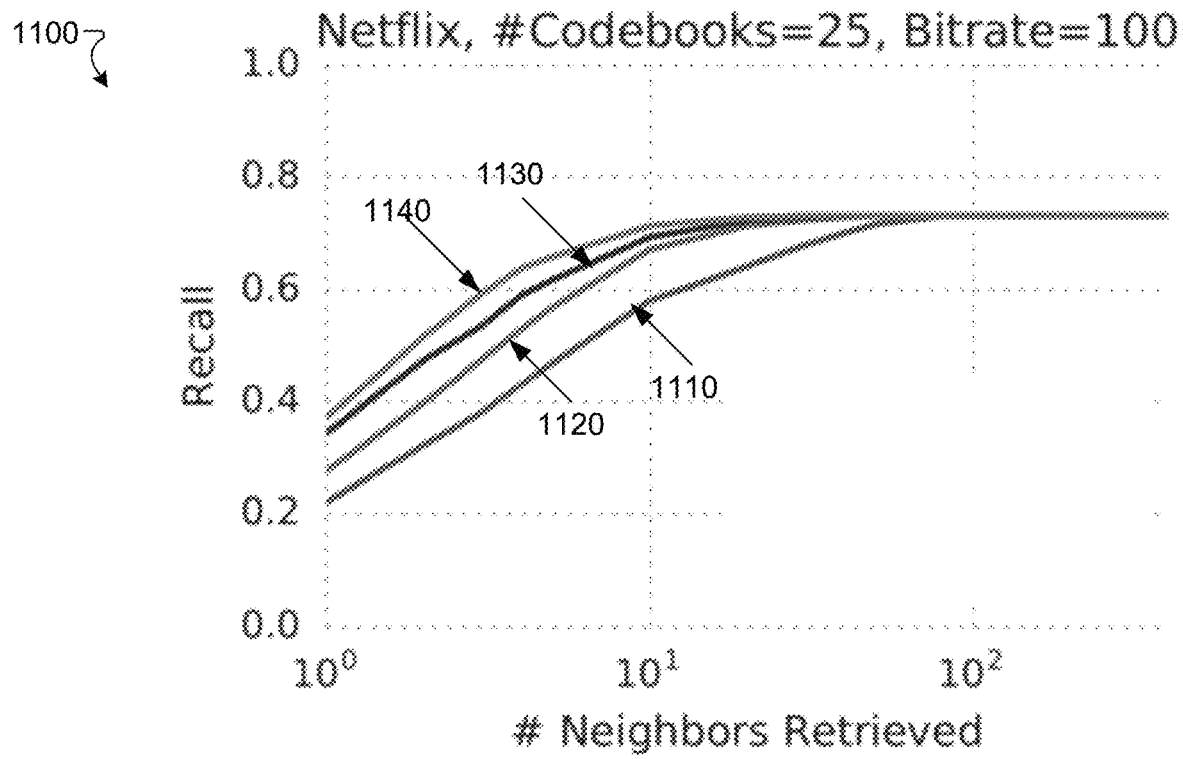
FIGS. 11A and 11B are diagrams illustrating example recall results within the electronic environments shown in FIGS. 1 and 2.

FIG. 11A is a diagram illustrating example recall results in the form of a plot 1100, corresponding to the Netflix dataset with 25 codebooks and a bitrate of 100. The plot 1100 shows curves 1110 corresponding to MIPS-OPQ, 1120 to MIPS-LOD-MSQ, 1130 to MIPS-MSQ, and 1140 to MIPS-LOD-OPQ.

Figure 11B:
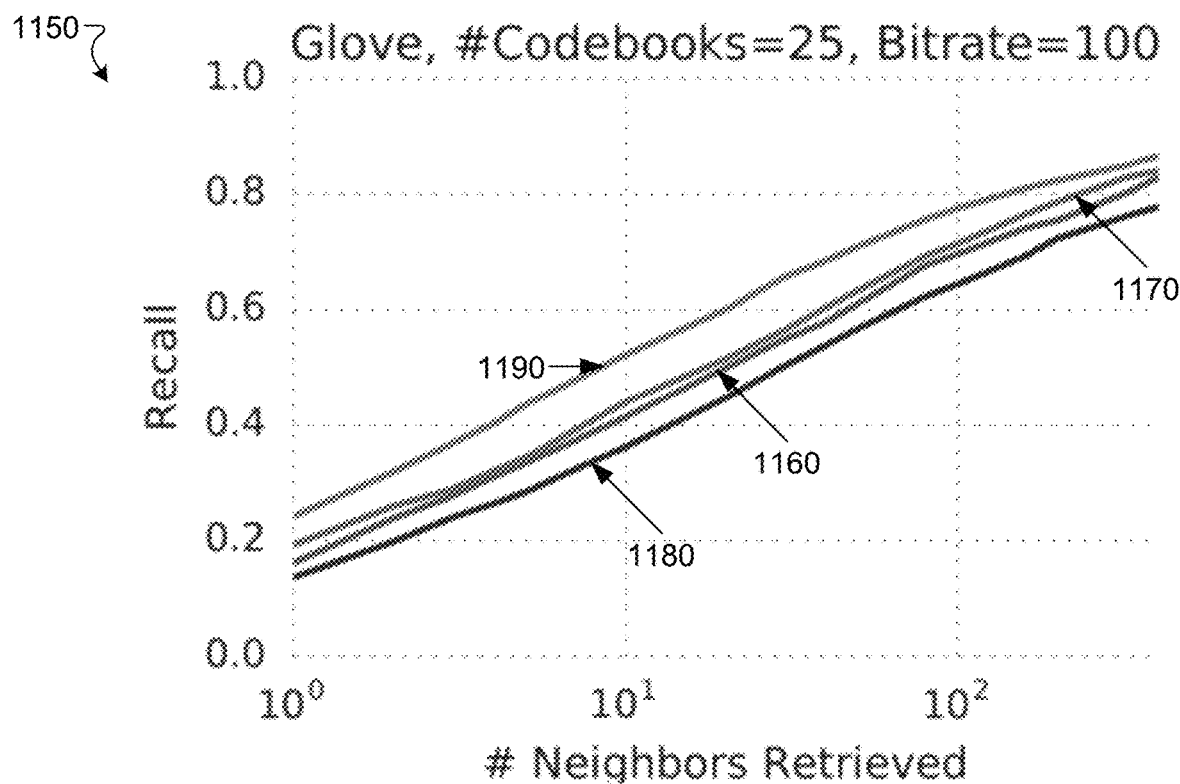

FIG. 11B is a diagram illustrating example recall results in the form of a plot 1150, corresponding to the Glove dataset with 25 codebooks and a bitrate of 100. The plot 1150 shows curves 1160 corresponding to MIPS-OPQ, 1170 to MIPS-LOD-MSQ, 1180 to MIPS-MSQ, and 1190 to MIPS-LOD-OPQ.

The combination of LOD+MSQ consistently outperforms either one in isolation. LOD performs much better than MSQ alone on Netflix and worse on Glove. This is due to the fact that in the normalized Glove dataset, orthogonal components of residuals have larger norms than projected components. With LOD only, OPQ is applied to the orthogonal components and it fails to preserve the $\ell_2$ norms at a low bitrate.

Figure 12:
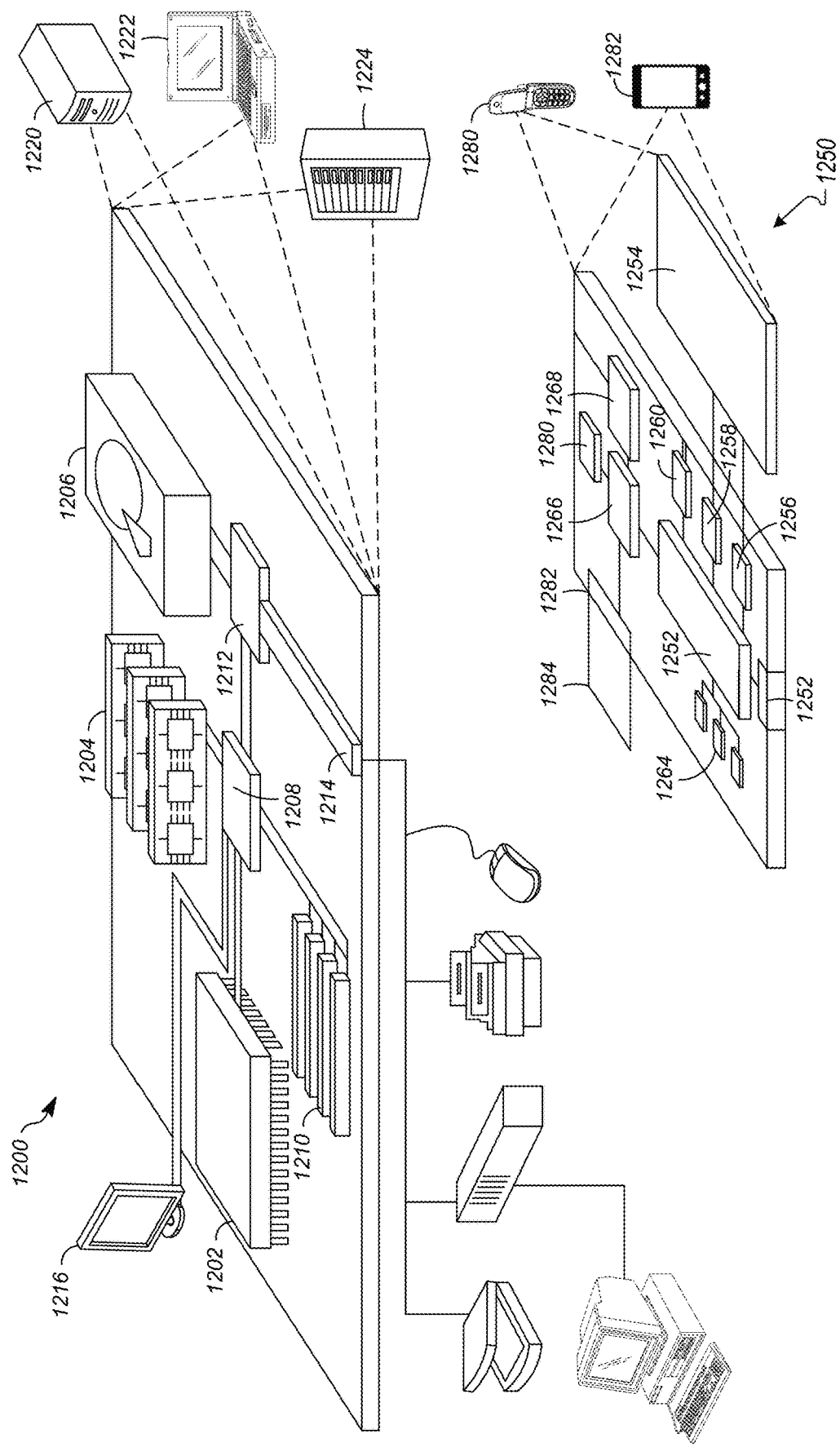
FIG. 12 illustrates an example of a computer device and a mobile computer device that can be used with circuits described here.

FIG. 12 illustrates an example of a generic computer device 1200 and a generic mobile computer device 1250, which may be used with the techniques described here.

As shown in FIG. 12, computing device 1200 is intended to represent various forms of digital computers, such as laptops, desktops, workstations, personal digital assistants, servers, blade servers, mainframes, and other appropriate computers. Computing device 1250 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 1200 includes a processor 1202, memory 1204, a storage device 1206, a high-speed interface 1208 connecting to memory 1204 and high-speed expansion ports 1210, and a low speed interface 1212 connecting to low speed bus 1214 and storage device 1206. Each of the components 1202, 1204, 1206, 1208, 1210, and 1212, are interconnected using various busses, and may be mounted on a common motherboard or in other manners as appropriate. The processor 1202 can process instructions for execution within the computing device 1200, including instructions stored in the memory 1204 or on the storage device 1206 to display graphical information for a GUI on an external input/output device, such as display 1216 coupled to high speed interface 1208. In other implementations, multiple processors and/or multiple buses may be used, as appropriate, along with multiple memories and types of memory. Also, multiple computing devices 1200 may be connected, with each device providing portions of the necessary operations (e.g., as a server bank, a group of blade servers, or a multi-processor system).

The memory 1204 stores information within the computing device 1200. In one implementation, the memory 1204 is a volatile memory unit or units. In another implementation, the memory 1204 is a non-volatile memory unit or units. The memory 1204 may also be another form of computer-readable medium, such as a magnetic or optical disk.

The storage device 1206 is capable of providing mass storage for the computing device 1200. In one implementation, the storage device 1206 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1204, the storage device 1206, or memory on processor 1202.

The high speed controller 1208 manages bandwidth-intensive operations for the computing device 600, while the low speed controller 1212 manages lower bandwidth-intensive operations. Such allocation of functions is exemplary only. In one implementation, the high-speed controller 1208 is coupled to memory 1204, display 1216 (e.g., through a graphics processor or accelerator), and to high-speed expansion ports 1210, which may accept various expansion cards (not shown). In the implementation, low-speed controller 1212 is coupled to storage device 1206 and low-speed expansion port 1214. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1200 may be implemented in a number of different forms, as shown in the figure. For example, it may be implemented as a standard server 1220, or multiple times in a group of such servers. It may also be implemented as part of a rack server system 1224. In addition, it may be implemented in a personal computer such as a laptop computer 1222. Alternatively, components from computing device 1200 may be combined with other components in a mobile device (not shown), such as device 1250. Each of such devices may contain one or more of computing device 1200, 1250, and an entire system may be made up of multiple computing devices 1200, 1250 communicating with each other.

Computing device 1250 includes a processor 1252, memory 1264, an input/output device such as a display 1254, a communication interface 1266, and a transceiver 1268, among other components. The device 1250 may also be provided with a storage device, such as a microdrive or other device, to provide additional storage. Each of the components 1250, 1252, 1264, 1254, 1266, and 1268, are interconnected using various buses, and several of the components may be mounted on a common motherboard or in other manners as appropriate.

The processor 1252 can execute instructions within the computing device 1250, including instructions stored in the memory 1264. The processor may be implemented as a chipset of chips that include separate and multiple analog and digital processors. The processor may provide, for example, for coordination of the other components of the device 1250, such as control of user interfaces, applications run by device 1250, and wireless communication by device 1250.

Processor 1252 may communicate with a user through control interface 1258 and display interface 1256 coupled to a display 1254. The display 1254 may be, for example, a TFT LCD (Thin-Film-Transistor Liquid Crystal Display) or an OLED (Organic Light Emitting Diode) display, or other appropriate display technology. The display interface 1256 may comprise appropriate circuitry for driving the display 254 to present graphical and other information to a user. The control interface 1258 may receive commands from a user and convert them for submission to the processor 1252. In addition, an external interface 1262 may be provided in communication with processor 1252, so as to enable near area communication of device 1250 with other devices. External interface 1262 may provide, for example, for wired communication in some implementations, or for wireless communication in other implementations, and multiple interfaces may also be used.

The memory 1264 stores information within the computing device 1250. The memory 1264 can be implemented as one or more of a computer-readable medium or media, a volatile memory unit or units, or a non-volatile memory unit or units. Expansion memory 1274 may also be provided and connected to device 1250 through expansion interface 1272, which may include, for example, a SIMM (Single In Line Memory Module) card interface. Such expansion memory 1274 may provide extra storage space for device 1250, or may also store applications or other information for device 1250. Specifically, expansion memory 1274 may include instructions to carry out or supplement the processes described above, and may include secure information also. Thus, for example, expansion memory 1274 may be provided as a security module for device 1250, and may be programmed with instructions that permit secure use of device 1250. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1264, expansion memory 1274, or memory on processor 1252, that may be received, for example, over transceiver 1268 or external interface 1262.

Device 1250 may communicate wirelessly through communication interface 1266, which may include digital signal processing circuitry where necessary. Communication interface 1266 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1268. In addition, short-range communication may occur, such as using a Bluetooth, WiFi, or other such transceiver (not shown). In addition, GPS (Global Positioning System) receiver module 1270 may provide additional navigation- and location-related wireless data to device 1250, which may be used as appropriate by applications running on device 1250.

Device 1250 may also communicate audibly using audio codec 1260, which may receive spoken information from a user and convert it to usable digital information. Audio codec 1260 may likewise generate audible sound for a user, such as through a speaker, e.g., in a handset of device 1250. Such sound may include sound from voice telephone calls, may include recorded sound (e.g., voice messages, music files, etc.) and may also include sound generated by applications operating on device 1250.

The computing device 1250 may be implemented in a number of different forms, as shown in the figure. For example, it may be implemented as a cellular telephone 1280. It may also be implemented as part of a smart phone 1282, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

Implementations of the method described with regard to FIG. 3 can include one or more of the following features, alone or in any combination with each other. The method can include receiving a quantized query vector having a first quantized component and a second quantized component; and generating, by the processing circuitry, an inner product of the query and a sum of the first quantized component and the second quantized component, the inner product indicating a degree of similarity between the query and the database element. The method can also include returning or not returning the database element of the plurality of database elements based on the degree of similarity. The first projection operator can include an outer product of the direction with itself. The second projection operator can include a difference between a unit operator and the first projection operator. The first quantization operation can include a scalar quantization operation. The second quantization operation can include a multiscale quantization operation, the multiscale quantization operation including a scale factor and a rotation matrix. The scale factor of the multiscale quantization operation can preserve a $\ell_2$ norm of the second term. The method can further include performing a scalar quantization operation on the scale factor of the multiscale quantization operation. Generating the inner product of the query and a sum of the first component and the second component can include generating a product of the rotation matrix of the multiscale quantization operation and the query. Performing the first quantization operation on the first component can include performing a uniform quantization operation on a difference between the residual term and the second component.

Implementations of the computer program product described with regard to FIG. 4 can include one or more of the following features, alone or in any combination with each other. Selecting a specified number of the plurality of net inner products can include determining largest values of the plurality of net inner products. The first quantized component of the database element can include a quantized component of a residual term parallel to a direction and the second quantized component of the database element can include a quantized component of the residual term perpendicular to the direction, the residual term being, for each of the plurality of partitions and, for that partition, each of the database elements of that partition, a difference between the center point of that partition and the database element. The first quantization operation can include a scalar quantization operation. The second quantization operation can include a multiscale quantization operation, the multiscale quantization operation including a scale factor and a rotation matrix. The scale factor of the multiscale quantization operation can preserve a $\ell_2$ norm of the residual term. The method can further include performing a scalar quantization operation on the scale factor of the multiscale quantization operation. Generating the perpendicular inner product can include generating a product of the rotation matrix of the multiscale quantization operation and the query.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Returning to FIGS. 1 and 2, in some implementations, the memory 126 and 226 can be any type of memory such as a random-access memory, a disk drive memory, flash memory, and/or so forth. In some implementations, the memory 126 and 226 can be implemented as more than one memory component (e.g., more than one RAM component or disk drive memory) associated with the components of the computers 120 and 220. In some implementations, the memory 126 and 226 can be a database memory. In some implementations, the memory 126 and 226 can be, or can include, a non-local memory. For example, the memory 126 and 226 can be, or can include, a memory shared by multiple devices (not shown). In some implementations, the memory 126 and 226 can be associated with a server device (not shown) within a network and configured to serve the components of the computers 120 and 220.

The components (e.g., modules, processing units 124 and 224) of the computers 120 and 220 can be configured to operate based on one or more platforms (e.g., one or more similar or different platforms) that can include one or more types of hardware, software, firmware, operating systems, runtime libraries, and/or so forth. In some implementations, the components of the computers 120 and 220 can be configured to operate within a cluster of devices (e.g., a server farm). In such an implementation, the functionality and processing of the components of the computers 120 and 220 can be distributed to several devices of the cluster of devices.

The components of the computers 120 and 220 can be, or can include, any type of hardware and/or software configured to process attributes. In some implementations, one or more portions of the components shown in the components of the computer 120 in FIG. 1 and the computer 220 in FIG. 2 can be, or can include, a hardware-based module (e.g., a digital signal processor (DSP), a field programmable gate array (FPGA), a memory), a firmware module, and/or a software-based module (e.g., a module of computer code, a set of computer-readable instructions that can be executed at a computer). For example, in some implementations, one or more portions of the components of the computers 120 and 220 can be, or can include, a software module configured for execution by at least one processor (not shown). In some implementations, the functionality of the components can be included in different modules and/or different components than those shown in FIGS. 1 and 2.

Although not shown, in some implementations, the components of the computers 120 and 220 (or portions thereof) can be configured to operate within, for example, a data center (e.g., a cloud computing environment), a computer system, one or more server/host devices, and/or so forth. In some implementations, the components of the computers 120 and 220 (or portions thereof) can be configured to operate within a network. Thus, the components of the computers 120 and 220 (or portions thereof) can be configured to function within various types of network environments that can include one or more devices and/or one or more server devices. For example, a network can be, or can include, a local area network (LAN), a wide area network (WAN), and/or so forth. The network can be, or can include, a wireless network and/or wireless network implemented using, for example, gateway devices, bridges, switches, and/or so forth. The network can include one or more segments and/or can have portions based on various protocols such as Internet Protocol (IP) and/or a proprietary protocol. The network can include at least a portion of the Internet.

In some embodiments, one or more of the components of the computer 120 can be, or can include, processors configured to process instructions stored in a memory. For example, the database manager 130 (and/or a portion thereof), the partition manager 140 (and/or a portion thereof), the projection manager 150 (and/or a portion thereof), and the quantization manager 160 (and/or a portion thereof can be a combination of a processor and a memory configured to execute instructions related to a process to implement one or more functions.

In some embodiments, one or more of the components of the computer 120 can be, or can include, processors configured to process instructions stored in a memory. For example, the indexed database manager 230 (and/or a portion thereof), the query manager 240 (and/or a portion thereof), the partition manager 250 (and/or a portion thereof), the IP manager 260 (and/or a portion thereof), and the output manager 170 (and/or a portion thereof can be a combination of a processor and a memory configured to execute instructions related to a process to implement one or more functions.

A number of embodiments have been described. Nevertheless, it will be understood that various modifications may be made without departing from the spirit and scope of the specification.

It will also be understood that when an element is referred to as being on, connected to, electrically connected to, coupled to, or electrically coupled to another element, it may be directly on, connected or coupled to the other element, or one or more intervening elements may be present. In contrast, when an element is referred to as being directly on, directly connected to or directly coupled to another element, there are no intervening elements present. Although the terms directly on, directly connected to, or directly coupled to may not be used throughout the detailed description, elements that are shown as being directly on, directly connected or directly coupled can be referred to as such. The claims of the application may be amended to recite exemplary relationships described in the specification or shown in the figures.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method, comprising:
   receiving, by processing circuitry configured to perform indexing and search operations in a database, a plurality of database elements and direction data indicating a direction;
   generating, by the processing circuitry, a plurality of partitions based on the plurality of database elements, each of the plurality of partitions corresponding to a respective subset of the plurality of database elements and including a respective center element;
   determining, for each database element of the plurality of database elements, a residual term, the residual term being a difference between the database element and the center element for the subset of the plurality of database elements to which the database element corresponds;
   performing, by the processing circuitry, a first projection operation on the residual term using a first projection operator to produce a first component of the residual term and a second projection operation on the residual term using a second projection operator to produce a second component of the residual term, the first projection operator and the second projection operator being based on the direction, the first component being parallel to the direction, the second component being perpendicular to the direction;
   performing, by the processing circuitry, a first quantization operation on the first component to produce a first quantized component;
   performing, by the processing circuitry, a second quantization operation on the second component to produce a second quantized component, the second quantization operation being different from the first quantization operation; and
   storing, by the processing circuitry, the first quantized component, the second quantized component, and the center element in respective locations in a memory, the first quantized component, the second quantized component, and the center element providing an indexing of the database.

2. The method as in claim 1, further comprising:
   receiving a quantized query vector having a first quantized component and a second quantized component; and generating, by the processing circuitry, an inner product of the query and a sum of the first quantized component and the second quantized component, the inner product indicating a degree of similarity between the query and the database element.

3. The method as in claim 2, further comprising:
   returning or not returning the database element of the plurality of database elements based on the degree of similarity.

4. The method as in claim 1, wherein the first projection operator includes an outer product of the direction with itself.

5. The method as in claim 1, wherein the second projection operator includes a difference between a unit operator and the first projection operator.

6. The method as in claim 1, wherein the first quantization operation includes a scalar quantization operation.

7. The method as in claim 1, wherein the second quantization operation includes a multi scale quantization operation, the multiscale quantization operation including a scale factor and a rotation matrix.

8. The method as in claim 7, wherein the scale factor of the multiscale quantization operation preserves a $\ell_2$ norm of the second component.

9. The method as in claim 7 further comprising performing a scalar quantization operation on the scale factor of the multiscale quantization operation.

10. The method as in claim 7, further comprising:
    receiving a quantized query vector having a first quantized component and a second quantized component; and
    generating an inner product of the query, the inner product indicating a degree of similarity between the query and the database element, including
    generating a product of the rotation matrix of the multiscale quantization operation and the query.

11. The method as in claim 1, wherein performing the first quantization operation on the first component includes:
    performing a uniform quantization operation on a difference between the residual term and the second component.

12. A computer program product comprising a nontransitory storage medium, the computer program product including code that, when executed by processing circuitry configured to process a query in a database, causes the processing circuitry to perform a method, the method comprising:
    receiving query data representing a query;
    for each of a first plurality of partitions of a database having database elements, generating a center inner product of the query and a respective center point of that partition to produce a plurality of center inner products;
    selecting a first number of the first plurality of partitions to produce a second plurality of partitions, the selecting being based on the plurality of center inner products;
    for each of the second plurality of partitions:
        for each database element in the partition:
            generating a parallel inner product, the parallel inner product being an inner product between a first quantized component for the query data and a first quantized component of the database element;
            generating a perpendicular inner product, the perpendicular inner product being an inner product between a second quantized component for the query data and a second quantized component for the database element; and
            generating a sum of the parallel inner product, the perpendicular inner product, and the center inner product of the plurality of center inner products for that partition to produce a net inner product, the net inner product indicating a degree of similarity between the query and the database element;
selecting a specified number of database elements based on the plurality of net inner products; and
returning the selected database elements.

13. The computer program product as in claim 12, wherein selecting a specified number of the plurality of net inner products includes determining largest values of the plurality of net inner products.

14. The computer program product as in claim 12, wherein the first quantized component of the database element includes a quantized component of a residual term parallel to a direction and the second quantized component of the database element includes a quantized component of the residual term perpendicular to the direction, the residual term being, for each of the plurality of partitions and, for that partition, each of the database elements of that partition, a difference between the center point of that partition and the database element.

15. The computer program product as in claim 14, wherein the parallel inner product is based on a scalar quantization operation.

16. The computer program product as in claim 14, wherein the perpendicular inner product is based on a multiscale quantization operation, the multiscale quantization operation including a scale factor and a rotation matrix.

17. The computer program product as in claim 16, wherein the scale factor of the multiscale quantization operation preserves a $\ell_2$ norm of the residual term.

18. The computer program product as in claim 16, wherein the method further comprises performing a scalar quantization operation on the scale factor of the multiscale quantization operation.

19. The computer program product as in claim 16, wherein generating the perpendicular inner product includes:
generating a product of the rotation matrix of the multiscale quantization operation and the query.

20. An electronic apparatus configured to perform indexing and search operations in a database, the electronic apparatus comprising:
memory; and
controlling circuitry coupled to the memory, the controlling circuitry being configured to:
receive a plurality of database elements and direction data indicating a direction;
generate a plurality of partitions based on the plurality of database elements, each of the plurality of partitions corresponding to a respective subset of the plurality of database elements and including a respective center element;
determine, for each database element of the plurality of database elements, a residual term, the residual term being a difference between the database element and the center element for the subset of the plurality of database elements to which the database element corresponds;
perform a first projection operation on the residual term using a first projection operator to produce a first component of the residual term and a second projection operation on the residual term using a second projection operator to produce a second component of the residual term, the first projection operator and the second projection operator being based on the direction, the first component being parallel to the direction, the second component being perpendicular to the direction;
perform a first quantization operation on the first component to produce a first quantized component;
perform a second quantization operation on the second component to produce a second quantized component, the second quantization operation being different from the first quantization operation; and
store the first quantized component, the second quantized component, and the center element in respective locations in a memory, the first quantized component and the second quantized component providing an indexing of the database.

* * * * *